(12) United States Patent
Miyazaki

(10) Patent No.: US 11,565,403 B2
(45) Date of Patent: Jan. 31, 2023

(54) ATTACHING MECHANISM, ROBOT APPARATUS, AND ATTACHING METHOD

(71) Applicant: CANON KABUSHIKI KAISHA, Tokyo (JP)

(72) Inventor: Yoshiyuki Miyazaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 354 days.

(21) Appl. No.: 16/578,750

(22) Filed: Sep. 23, 2019

(65) Prior Publication Data

US 2020/0108497 A1 Apr. 9, 2020

(30) Foreign Application Priority Data

Oct. 9, 2018 (JP) .............................. JP2018-191306
Aug. 23, 2019 (JP) .............................. JP2019-153045

(51) Int. Cl.
*B25J 9/08* (2006.01)
*B25J 19/00* (2006.01)
*B25J 15/04* (2006.01)

(52) U.S. Cl.
CPC .............. *B25J 9/08* (2013.01); *B25J 15/045* (2013.01); *B25J 19/0033* (2013.01)

(58) Field of Classification Search
CPC ....... B25J 15/04; B25J 15/0408; B25J 15/045
See application file for complete search history.

(56) References Cited

U.S. PATENT DOCUMENTS

| 4,715,636 A * | 12/1987 | Wiesner | B25J 15/0475 901/31 |
| 4,826,230 A | 5/1989 | Truchet | |
| 5,035,457 A * | 7/1991 | Tveit | B25J 15/04 901/41 |
| 7,794,171 B2 * | 9/2010 | Park | B25J 3/04 403/349 |

(Continued)

FOREIGN PATENT DOCUMENTS

| CN | 1332110 | 1/2002 |
| CN | 1993558 | 7/2007 |

(Continued)

OTHER PUBLICATIONS

Japanese Office Action, dated Sep. 1, 2020, in Japanese Application No. 2019-153045.
Office Action dated Dec. 1, 2022 in counterpart Chinese Application No. 201910953286.8, together with English translation thereof.

*Primary Examiner* — Jake Cook
(74) *Attorney, Agent, or Firm* — Venable LLP

(57) ABSTRACT

An attaching mechanism includes a fastening member, a first member, a second member including an insertion portion through which the fastening member passes, and a third member configured to enable the fastening member to pass through the insertion portion when the third member is located at a first position, and engage with the fastening member and disable the fastening member from passing through the insertion portion when the third member is located at a second position. When the third member is located at the second position, and the fastening member is (Continued)

moved toward a predetermined direction, the third member is pressed by the fastening member toward the predetermined direction, and the second member is attached to the first member.

22 Claims, 13 Drawing Sheets

(56) References Cited

U.S. PATENT DOCUMENTS

| | | | |
|---|---|---|---|
| 8,403,387 B2 | 3/2013 | Nakasugi et al. | |
| 9,095,984 B2 | 8/2015 | Miyazaki | |
| 2001/0040327 A1 | 11/2001 | Kashiwazaki et al. | ..................... B25B 11/00 |
| 2006/0024143 A1 | 2/2006 | Wei | ......................... F16B 13/04 |
| 2007/0231063 A1 | 10/2007 | Tsutsumi et al. | ..... B23B 31/107 |
| 2008/0042432 A1 | 2/2008 | Park et al. | .................. 285/124.4 |
| 2014/0102547 A1* | 4/2014 | Maffeis | ................... F16L 39/00 285/124.1 |
| 2017/0239823 A1* | 8/2017 | Bellandi | ............... F16L 37/252 |

FOREIGN PATENT DOCUMENTS

| | | |
|---|---|---|
| CN | 106439693 | 2/2017 |
| JP | S56-064605 U | 5/1981 |
| JP | S63-162183 A | 7/1988 |
| JP | H05-169383 A | 7/1993 |
| JP | H09-47325 A | 2/1997 |
| JP | 2001-277168 A | 10/2001 |
| JP | 2003-117869 A | 4/2003 |
| JP | 2006-015429 A | 1/2006 |
| JP | 2009-078312 A | 4/2009 |
| JP | 2014-188616 A | 10/2014 |
| WO | 2004/113031 | 12/2004 |

* cited by examiner

ATTACHING MECHANISM, ROBOT APPARATUS, AND ATTACHING METHOD

BACKGROUND OF THE INVENTION

Field of the Invention

The present invention relates to a technique on attaching mechanism.

Description of the Related Art

In recent years, robot apparatuses are used to assemble or machine products, such as cameras and printers, which have small and complicated structures. Components used in such products are mostly small precision parts, and vary in shape. In addition, a robot apparatus is required to continuously manufacture a variety of products. In a production site, when a type of workpiece or a process is changed, an end effector, such as a hand or a tool, of a robot apparatus is replaced. Japanese Patent Application Publication No. 2003-117869 describes a technique to replace the hand.

Since the replacement of the end effector is performed manually by an operator and involves labor and time, the replacement is required to be simplified as much as possible. In addition, it is also required that the end effector is attached with high reproducibility in the replacement and durable for the repeated replacement operations.

SUMMARY OF THE INVENTION

According to a first aspect of the present invention is an attaching mechanism including a fastening member, a first member, a second member including an insertion portion through which the fastening member passes, and a third member configured to enable the fastening member to pass through the insertion portion when the third member is located at a first position, and engage with the fastening member and disable the fastening member from passing through the insertion portion when the third member is located at a second position. When the third member is located at the second position, and the fastening member is moved toward a predetermined direction, the third member is pressed by the fastening member toward the predetermined direction, and the second member is attached to the first member.

According to a second aspect of the present invention is a method for attaching an end effector to a robot arm via a fastening member, the robot arm including a first member having a screw hole to which the fastening member is screwed into, the end effector including a second member and a third member, the second member including an insertion portion through which the fastening member passes, the third member being configured to enable the fastening member to pass through the insertion portion when located at a first position, and engage with the fastening member and disable the fastening member from passing through the insertion portion when located at a second position, the method including moving the third member to the first position, contacting the first member and the second member such that the fastening member passes through the insertion portion in a state where at least one portion of the fastening member has been screwed into the screw hole, moving the third member to the second position, and pressing the third member located at the second position, by tightening the fastening member for attaching the end effector to the robot arm.

According to a third aspect of the present invention is an attaching mechanism for attaching a robot hand to a robot arm, including a fastening member, and a wedge member configured to engage with a first sloped surface of the robot arm and a second sloped surface of the robot hand when the fastening member is tightened, and move away from the first sloped surface and the second sloped surface when the fastening member is loosened.

Further features of the present invention will become apparent from the following description of exemplary embodiments with reference to the attached drawings.

DESCRIPTION OF THE EMBODIMENTS

Exemplary embodiments of the present invention will be described below in detail with reference to drawings.

First Embodiment

Figure 1:
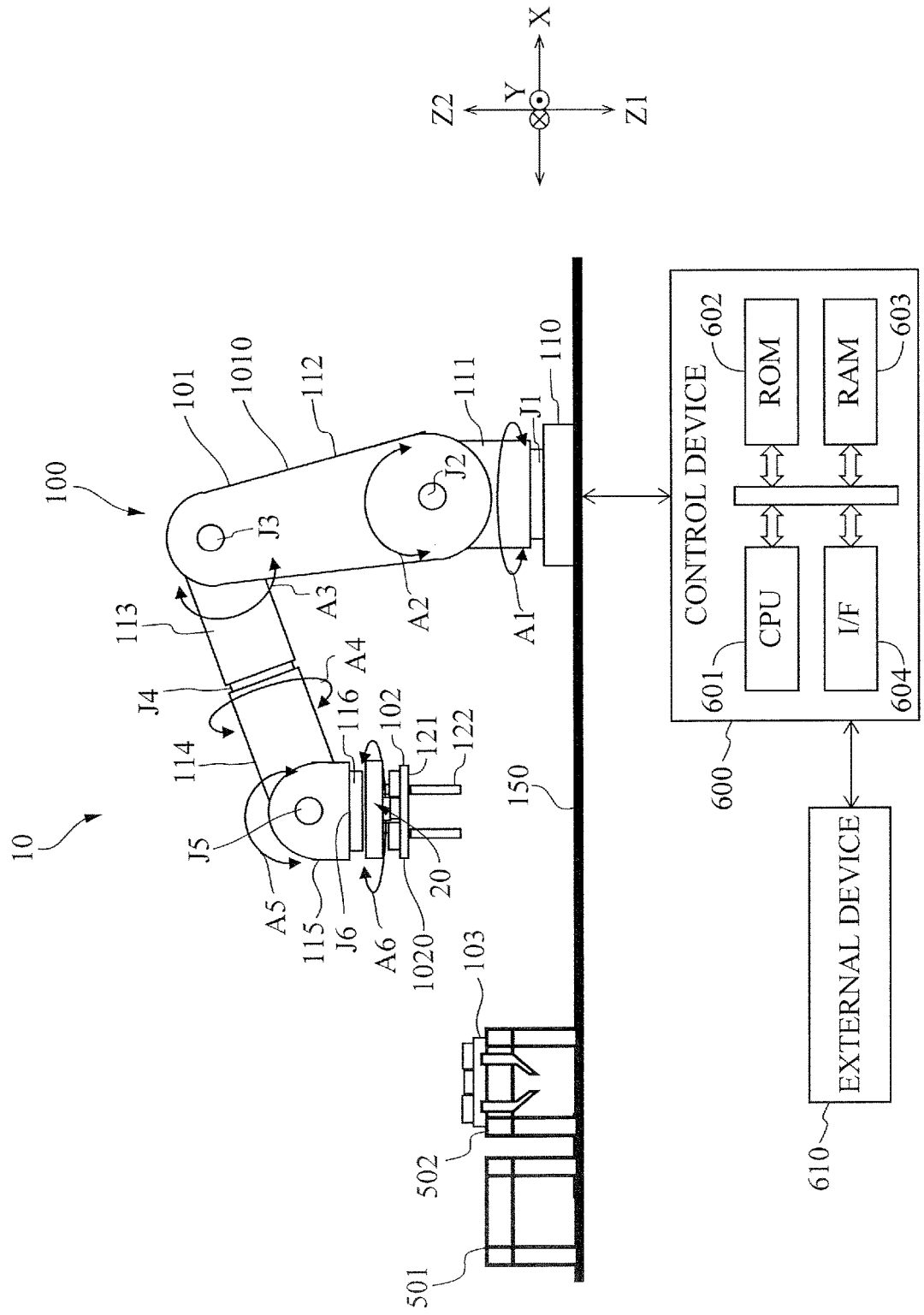
FIG. 1 is a diagram illustrating a schematic configuration of a robot system of a first embodiment.

FIG. 1 is a diagram illustrating a schematic configuration of a robot system 10 of a first embodiment. In FIG. 1, the robot system 10 includes a robot apparatus 100, and a control device 600 that controls the robot apparatus 100. The control device 600 is connected with an external device 610, such as an external computer or a teaching pendant. The robot apparatus 100 is an industrial robot, and disposed in a production line.

The robot apparatus 100 includes a robot arm 101, and a robot hand 102 that is one example of end effectors. The robot hand 102 can be attached to or detached from the robot arm 101. In FIG. 1, the robot hand 102 is attached to the robot arm 101. The robot arm 101 includes a robot arm body 1010. The robot hand 102 includes a hand body 1020, which is an end effector body. The robot arm body 1010 and the hand body 1020 are joined with each other via an interface device 20 that is an attaching mechanism interposed between the robot arm body 1010 and the hand body 1020. The robot arm 101 includes a first portion of the interface device 20. The robot hand 102 includes a second portion of the interface device 20. The first portion of the interface device 20 is disposed on the robot arm body 1010, and the second portion of the interface device 20 is disposed on the hand body 1020. When the first portion and the second portion of the interface device 20 are joined with each other, the robot hand 102 can be attached to the robot arm 101.

The robot arm 101 is a vertically articulated robot arm, and includes seven links 110 to 116 that are serially linked with each other by six joints J1 to J6. The link 110 is fixed to a base surface 150 of a base member. The links 111 to 116 can be swung or rotated by the respective joints J1 to J6. In FIG. 1, rotational directions of the joints J1 to J6 are respectively indicated by arrows A1 to A6. Here, any of the links may be linearly moved by a linear actuator.

The hand body 1020 includes a palm unit 121 and a plurality of fingers 122. The fingers 122 move with respect to the palm unit 121, in a direction in which the fingers 122 open or close. The palm unit 121 includes a motor (not illustrated). The fingers 122 are opened or closed by the motor (not illustrated) of the palm unit 121.

On the base surface 150 and in the vicinity of the robot apparatus 100, support bases 501 and 502 are disposed. The support bases 501 and 502 can support end effectors that are not attached to the robot arm 101. In FIG. 1, a robot hand 103, which is one example of end effectors that can be attached to the robot arm 101, is disposed on the support base 502. Like the robot hand 102, the robot hand 103 also includes the second portion of the interface device 20. If the robot hand 102 has been attached to the robot arm 101, the robot hand 102 can be detached from the robot arm 101, and then the robot hand 103 can be attached to the robot arm 101 in place of the robot hand 102. If the robot hand 103 has been attached to the robot arm 101, the robot hand 103 can be detached from the robot arm 101, and then the robot hand 102 can be attached to the robot arm 101 in place of the robot hand 103.

The control device 600 is a computer, for example. The control device 600 includes a CPU 601 that is a processor, a ROM 602 that stores a program to cause the CPU 601 to control each component, a RAM 603 that temporarily stores data such as teach point data and teach instruction data, and a communication interface (I/F) 604. The external device 610 can be communicatively connected to the control device 600 via wire or wirelessly, and has a user interface function for operating the robot apparatus 100 and displaying a status of the robot apparatus 100. The CPU 601 creates trajectory data for each joint, in accordance with the teach point data sent from the external device 610 for example; and controls the motion of each joint of the robot arm 101, via the I/F 604.

Here, two directions parallel to the base surface 150 and orthogonal to each other are defined as an X direction and a Y direction. In addition, a downward direction perpendicular to the base surface 150 is defined as a Z1 direction, and an upward direction opposite to the Z1 direction is defined as a Z2 direction.

Figure 2A:
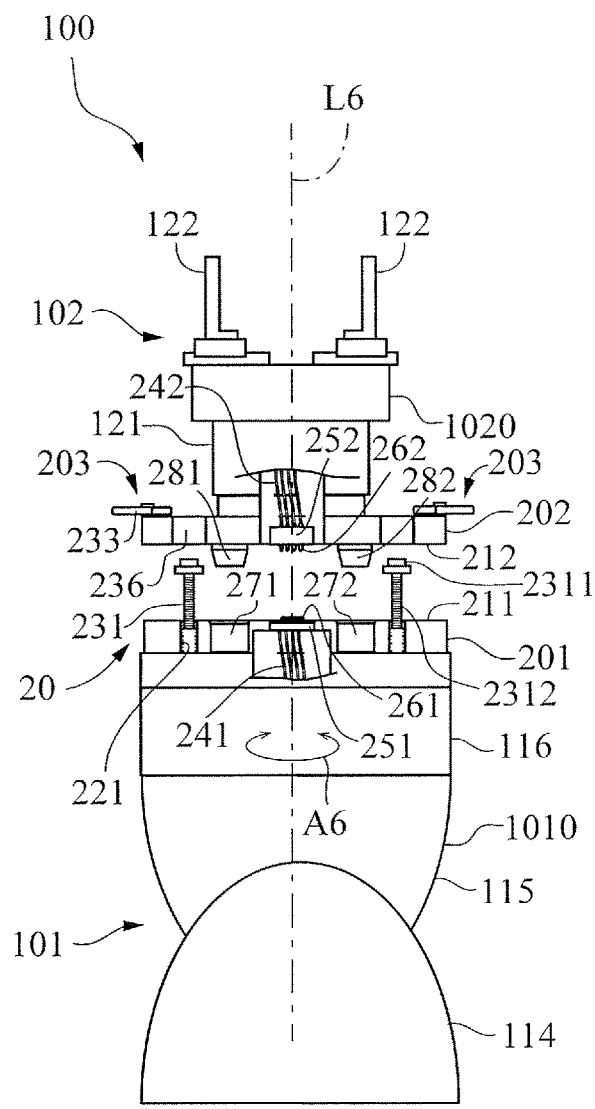
FIG. 2A is a diagram illustrating a joint structure of the first embodiment, formed between a robot arm and a robot hand.
Figure 2B:
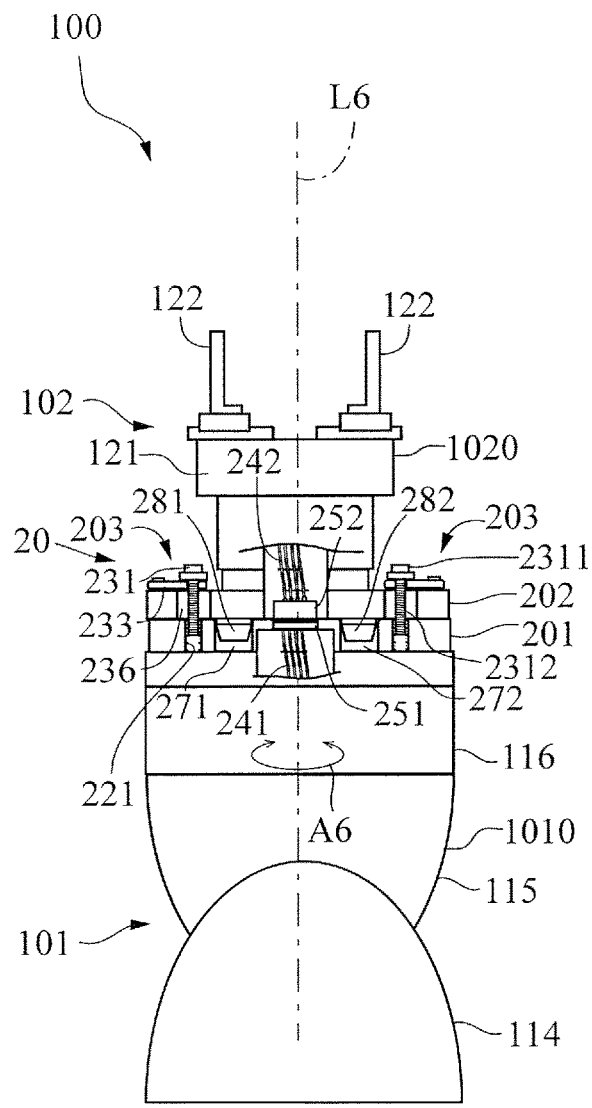
FIG. 2B is a diagram illustrating the joint structure of the first embodiment, formed between the robot arm and the robot hand.
Figure 2B:
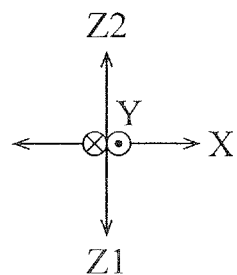
Figure 2B:
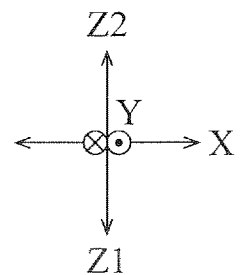

FIGS. 2A and 2B are diagrams illustrating a joint structure of the first embodiment, formed between the robot arm 101 and the robot hand 102. FIG. 2A illustrates a state where the robot hand 102 is detached from the robot arm 101, and FIG. 2B illustrates a state where the robot hand 102 is attached to the robot arm 101. In FIGS. 2A and 2B, one part of the robot arm 101 and the robot hand 102 is illustrated in its cross section for convenience of description. In the present embodiment, the replacement of the robot hand 102 is performed by an operator. Since the robot hand 102 is heavy, the replacement of the robot hand 102 is performed in a state where the robot arm 101 has a posture illustrated in FIGS. 2A and 2B. That is, the posture of the robot arm 101 is adjusted so that a distal end of the robot arm 101 faces upward. With this posture, the robot hand 102 can be easily replaced. In the first embodiment, the Z1 direction when the distal end of the robot arm 101 faces upward is a predetermined direction. In FIGS. 2A and 2B, one portion of the robot arm 101 on the distal end side with respect to the link 114 is illustrated, and the other portion of the robot arm 101 on the base end side with respect to the link 114 is not illustrated.

The interface device 20 includes a master plate 201, as a first member, fixed to the link 116 of the robot arm body 1010. The link 116 is a rotary portion, which is positioned at the distal end of the robot arm body 1010. The master plate 201 is fixed to the link 116 via a bolt or the like (not illustrated). Thus, the master plate 201 can be detachably attached to the robot arm body 1010, that is, to the link 116. The interface device 20 also includes a tool plate 202, as a second member, fixed to the palm unit 121 of the hand body 1020. The tool plate 202 is fixed to the palm unit 121 via a bolt or the like (not illustrated). Thus, the tool plate 202 can be detachably attached to the hand body 1020, that is, to the palm unit 121.

The master plate 201 includes a flat surface 211 that is a first main surface. The tool plate 202 includes a flat surface 212 that is a second main surface. The flat surface 212 can abut against the flat surface 211 of the master plate 201. The interface device 20 further includes fastening mechanisms 203. Each of the fastening mechanisms 203 fastens the tool plate 202 to the master plate 201 in a state where the flat surface 212 abuts against the flat surface 211. In the present embodiment, the interface device 20 includes two fastening mechanisms 203, for example.

The master plate 201 supports a connector 251 that is a first electrical connection portion. The connector 251 is disposed in a hollow portion of the master plate 201. The tool plate 202 supports a connector 252 that is a second electrical connection portion. The connector 252 is disposed in a hollow portion of the tool plate 202. The connector 251 includes a plurality of contacts 261 that are first contacts, and the connector 252 includes a plurality of contacts 262 that are second contacts.

The contacts 261 of the connector 251 fixed to the master plate 201 are connected to lines 241, such as signal lines or power lines, disposed inside or outside the robot arm body 1010 of the robot arm 101. The lines 241 extend from the control device 600 illustrated in FIG. 1. If the lines 241 are disposed inside the robot arm body 1010 of the robot arm 101, the lines 241 can be prevented from interfering with members disposed near the robot apparatus 100.

The contacts 262 of the connector 252 fixed to the tool plate 202 are connected to lines 242, such as signal lines or power lines, disposed inside or outside the hand body 1020 of the robot hand 102. The lines 242 are connected to a control board, a motor, and the like (not illustrated) disposed inside the palm unit 121. If the lines 242 are disposed inside the hand body 1020 of the robot hand 102, the lines 242 can be prevented from interfering with members disposed near the robot apparatus 100.

When the flat surface 212 abuts against the flat surface 211, the plurality of contacts 262 contact the plurality of contacts 261. Thus, the lines 241 and the lines 242 are electrically connected with each other. The plurality of contacts 261 or 262 may be spring contacts. In the present embodiment, the plurality of contacts 262 are spring contacts, and each of the contacts 262 pressure-contacts a corresponding one of the contacts 261 when the flat surface 212 abuts against the flat surface 211.

The link 116, which is a rotary portion, is rotated by the joint J6 toward a direction indicated by an arrow A6. Specifically, the link 116 is rotated with respect to the link 115, on a rotation axis L6 that is a predetermined rotation axis. Thus, the master plate 201 fixed to the link 116, and the connector 251 fixed to the master plate 201 also rotate on the rotation axis L6, together with the link 116.

When the robot arm 101 is operated in a production line, the weight of the robot hand 102, or the total weight of the robot hand 102 and a workpiece held by the robot hand 102 is applied to the interface device 20. For example, when the robot hand 102 conveys a first workpiece at high speed while holding the first workpiece, or puts the first workpiece on a second workpiece, the weight of the robot hand 102, or the total weight of the robot hand 102 and the workpiece held by the robot hand 102 is applied to the interface device 20. When an external force is applied to the robot hand 102, the moment is produced, and the tool plate 202 tends to be tilted with respect to the master plate 201 even though the tool plate 202 is fastened to the master plate 201 by fastening mechanisms 203. When the tool plate 202 is tilted with respect to the master plate 201, the flat surface 211 of the master plate 201 and the flat surface 212 of the tool plate 202 are partly separated from each other. The distance of the separation tends to increase at a position more away from the rotation axis L6 in the radial direction. Since the direction of the external force applied to the robot hand 102 changes in accordance with the posture of the robot arm 101 or the acceleration of motion of the robot arm 101, the direction of the tilt of the tool plate 202 also changes. Thus, a portion of the tool plate 202 that is away from the master plate 201 also changes in position in a circumferential direction, around the rotation axis L6.

In the present embodiment, the connector 251 is disposed on the rotation axis L6. When the robot hand 102 is attached to the robot arm 101, the connector 252 is also positioned on the rotation axis L6 because the connector 252 is connected with the connector 251. Thus, even when the tool plate 202 is tilted with respect to the master plate 201 by the external force, the distance of separation between a portion of the master plate 201 located on the rotation axis L6 and a portion of the tool plate 202 located on the rotation axis L6 is small. Consequently, even when the robot arm 101 is moved at high speed, the contact state between the contacts 261 and the contacts 262, that is, the contact pressure between the contacts 261 and the contacts 262 can be kept, so that the electrical connection between the contacts 261 and the contacts 262 can be stabilized. As a result, noise and instantaneous power interruption can be prevented from occurring, so that the frequency of emergency stop of the robot apparatus 100 can be reduced. Therefore, the productivity of products manufactured by the robot apparatus 100 can be increased.

One of the master plate 201 and the tool plate 202, that is, the tool plate 202 in the present embodiment includes positioning pins 281 and 282. The positioning pin 281 is a first positioning pin that protrudes from the flat surface 212, and the positioning pin 282 is a second positioning pin that protrudes from the flat surface 212. The positioning pins 281 and 282 are disposed outside the connector 252 in the radial direction. That is, since a center portion of the tool plate 202 is a hollow portion in which the connector 252 and the lines 242 are disposed, the positioning pins 281 and 282 are disposed around the hollow portion. The positioning pins 281 and 282 are rotationally symmetric such that the positioning pins 281 and 282 change places with each other when rotated around the rotation axis L6 by 180 degrees.

The other of the master plate 201 and the tool plate 202, that is, the master plate 201 in the present embodiment includes positioning holes 271 and 272. The positioning hole 271 is a first positioning hole in which the positioning pin 281 fits, and the positioning hole 272 is a second positioning hole in which the positioning pin 282 fits. The positioning holes 271 and 272 are concave with respect to the flat surface 211. The positioning holes 271 and 272 are disposed outside the connector 251 in the radial direction. That is, since a center portion of the master plate 201 is a hollow portion in which the connector 251 and the lines 241 are disposed, the positioning holes 271 and 272 are disposed around the hollow portion. The positioning holes 271 and 272 are rotationally symmetric such that the positioning holes 271 and 272 change places with each other when rotated around the rotation axis L6 by 180 degrees. When the positioning pins 281 and 282 fit in the positioning holes 271 and 272, the tool plate 202 is positioned with respect to the master plate 201 with high accuracy, that is, the connector 252 is positioned with respect to the connector 251 with high accuracy. The tool plate 202 positioned in this manner is fastened and fixed to the master plate 201 via the fastening mechanisms 203. As a result, the electrical connection between the contacts 261 and the contacts 262 can be stabilized.

Figure 3A:
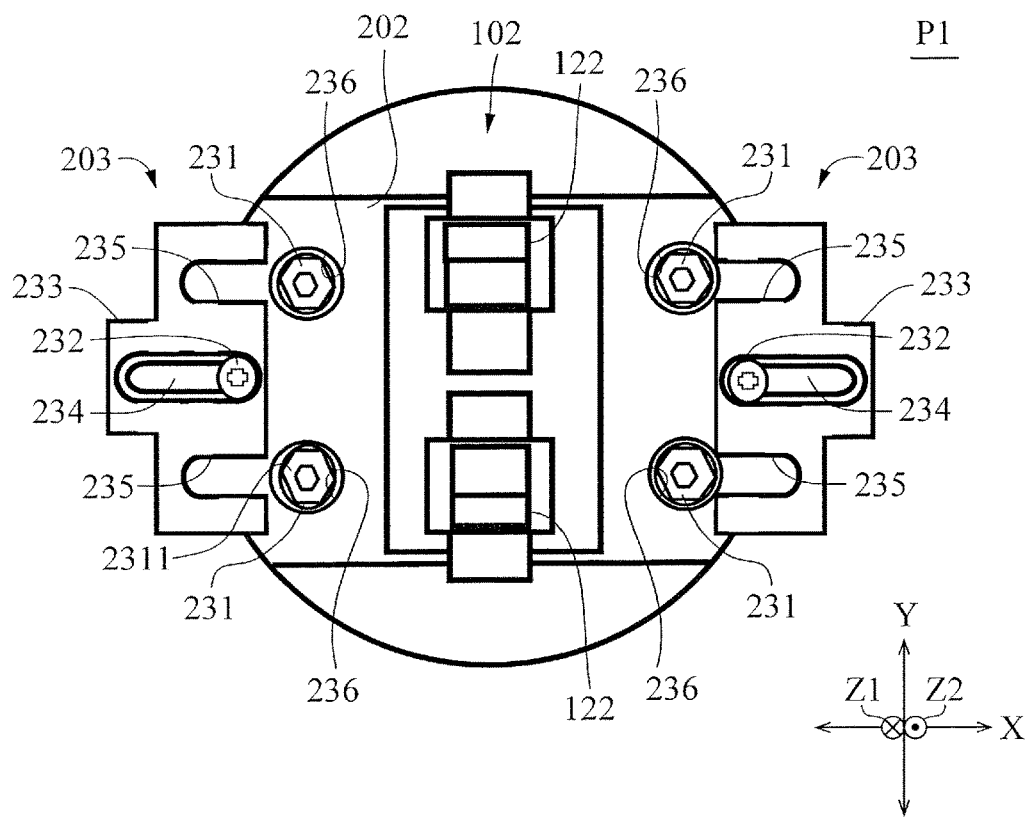
FIG. 3A is a plan view of the robot arm and the robot hand of the first embodiment.
Figure 3B:
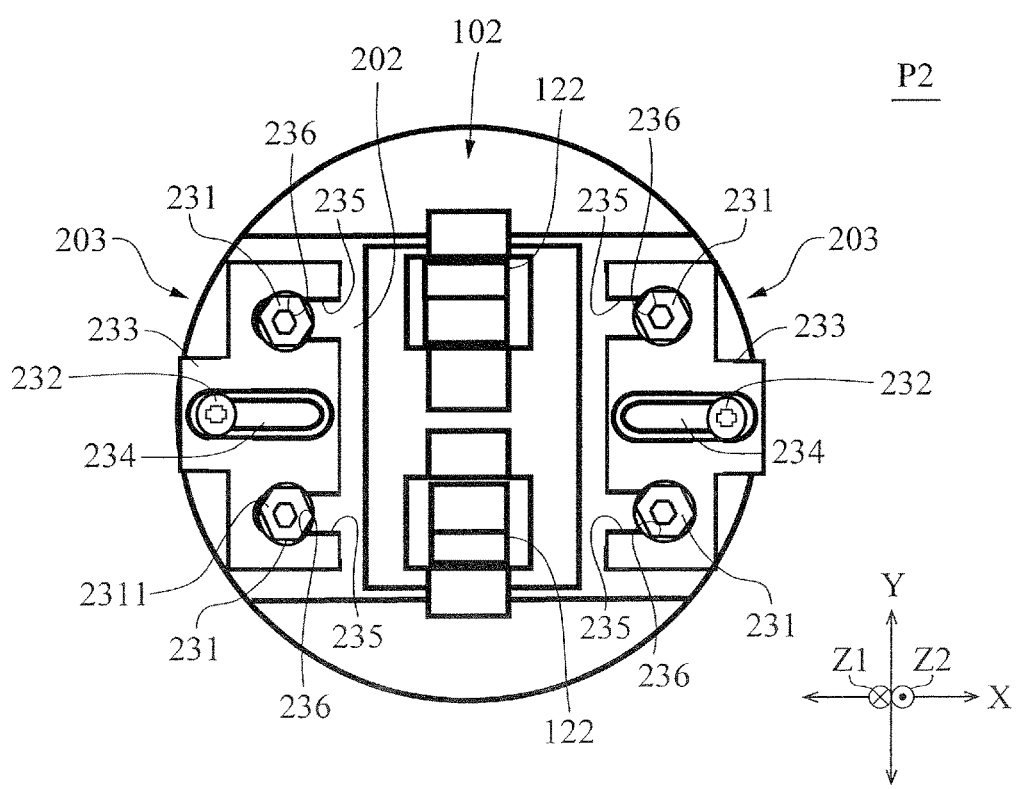
FIG. 3B is a plan view of the robot arm and the robot hand of the first embodiment.

FIGS. 3A and 3B are plan views of the robot arm and the robot hand of the first embodiment, as viewed in the Z1 direction. As illustrated in FIGS. 2A, 2B, 3A, and 3B, each of the fastening mechanisms 203 includes a bolt 231 that is one example of fastening members. The bolt 231 is fixed to the master plate 201 such that the bolt 231 can be separated from the master plate 201. Each of the fastening mechanisms 203 also includes a pressing member 233 that is a third member. When the pressing member 233 is pressed by a top portion 2311 of the bolt 231 fixed to the master plate 201, the pressing member 233 presses the tool plate 202 toward the master plate 201. The master plate 201 includes a screw hole 221 into which the bolt 231 is screwed.

The pressing member 233 is disposed on a surface of the tool plate 202 opposite to the flat surface 212 so that the pressing member 233 can slide in the X direction. The bolt 231 is fixed to the flat surface 211 of the master plate 201. The pressing member 233 has a long hole 234. The pressing member 233 is supported by the tool plate 202 via a bolt 232 that fits in the long hole 234, and thus can slide in the X direction, which is the longitudinal direction of the long hole 234.

The tool plate 202 has a through-hole 236 through which the top portion 2311 of the bolt 231, which has been screwed into the screw hole 221 of the master plate 201, can pass. The through-hole 236 is one example of insertion portions. When the flat surface 212 of the tool plate 202 abuts against the flat surface 211 of the master plate 201, the top portion 2311 of the bolt 231 passes through the through-hole 236 and protrudes from the tool plate 202 toward the Z2 direction.

The pressing member 233 also has a cutout 235 that is one example of narrowing portions to narrow the through-hole 236. When the pressing member 233 slides, the cutout 235 can engage with or disengage from the top portion 2311 of the bolt 231. The cutout 235 is formed narrower than the through-hole 236 so that the top portion 2311 of the bolt 231 engages with the pressing member 233. The cutout 235 extends linearly in the X direction, which is the longitudinal direction of the cutout 235 parallel to the long hole 234. FIG. 3A illustrates a state where the pressing member 233 is located at a retraction position P1 and the cutout 235 is separated from the bolt 231. The retraction position P1 is a first position. FIG. 3B illustrates a state where the pressing member 233 is located at an engagement position P2 and the cutout 235 engages with the bolt 231. The engagement position P2 is a second position. The width of the cutout 235 in the lateral direction is larger than the diameter of a shaft portion 2312 of the bolt 231 illustrated in FIGS. 2A and 2B, and smaller than the diameter of the top portion 2311 of the bolt 231. When the pressing member 233 slides and the shaft portion 2312 of the bolt 231 fits in the cutout 235, the pressing member 233 can be pressed toward the tool plate 202 by the top portion 2311 of the bolt 231. The tool plate 202 is pressed against the master plate 201 via the pressing member 233 that is pressed by the top portion 2311 of the bolt 231.

Next, a method for attaching the robot hand 102 to the robot arm 101 will be described in detail. FIGS. 4A, 4B, 5A, and 5B are diagrams for illustrating the method of the first embodiment, for attaching the robot hand 102 to the robot arm 101. FIGS. 4A, 4B, 5A, and 5B schematically illustrate a cross section of the interface device 20.

Figure 4A:
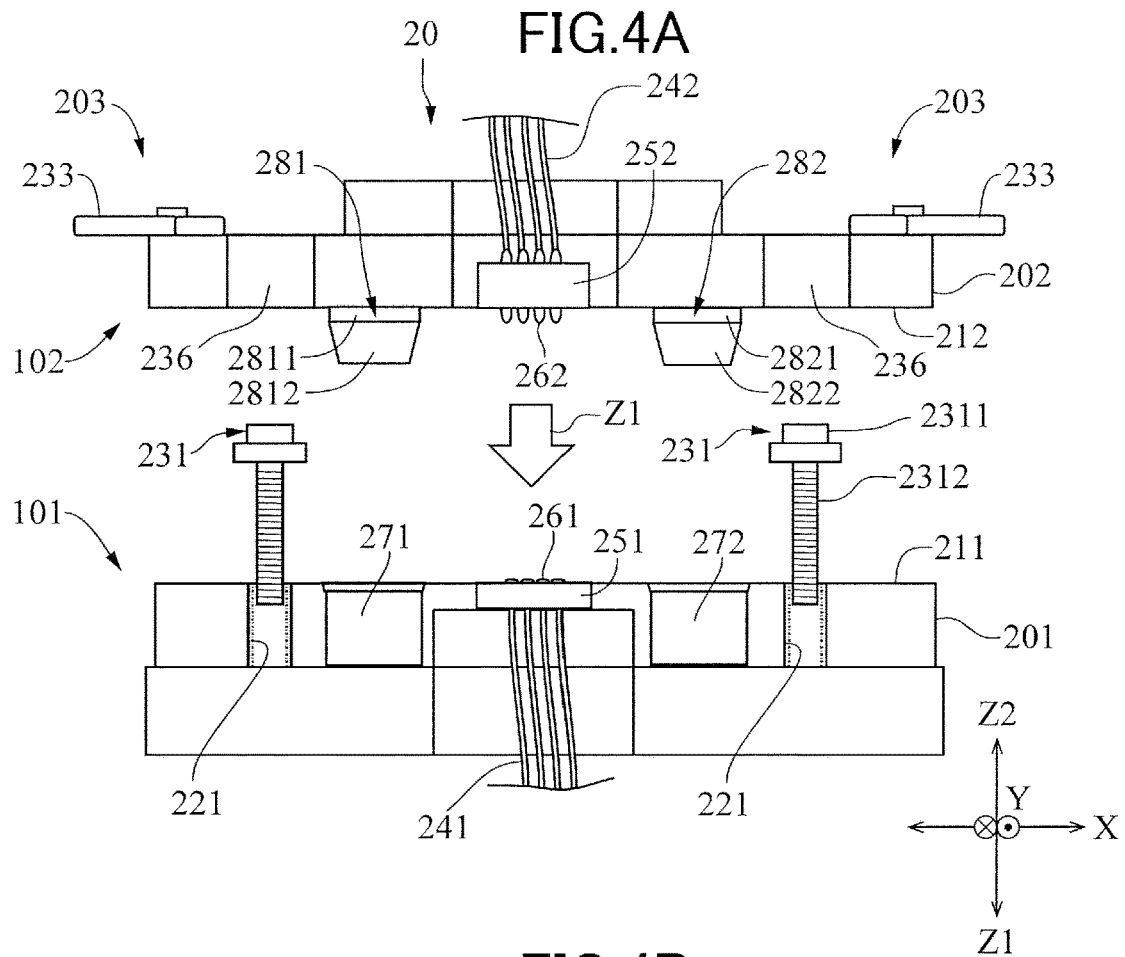
FIG. 4A is a diagram for illustrating a method of the first embodiment, for attaching the robot hand to the robot arm.
Figure 4B:
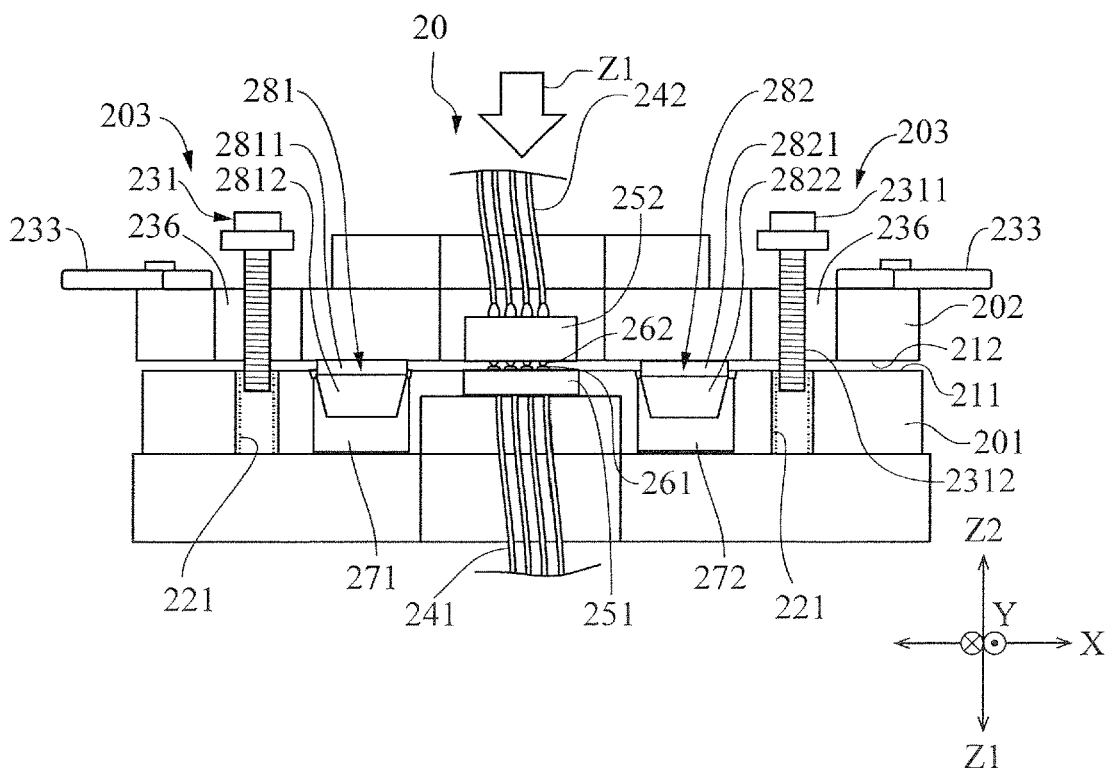
FIG. 4B is a diagram for illustrating the method of the first embodiment, for attaching the robot hand to the robot arm.

As illustrated in FIG. 4A, the robot arm 101 and the robot hand 102 are prepared. The positioning pins 281 and 282 of the tool plate 202 of the robot hand 102 are positioned so as to face the positioning holes 271 and 272 of the master plate 201 of the robot arm 101. Then the robot hand 102 is moved toward the Z1 direction to insert the positioning pins 281 and 282 of the tool plate 202 into the positioning holes 271 and 272 of the master plate 201, as illustrated in FIG. 4B. The top portion 2311 and part of the shaft portion 2312 of each bolt 231, which has been screwed into the screw hole 221 of the master plate 201, pass through a corresponding through-hole 236 and protrudes from the tool plate 202 toward the Z2 direction. In this time, the pressing member 233 supported by the tool plate 202 is located away from the engagement position P2, which is illustrated in FIG. 3B and at which the pressing member 233 engages with the bolt 231. Since the pressing member 233 is located at the retraction position P1 illustrated in FIG. 3A, the top portion 2311 of the bolt 231 can pass through the through-hole 236 of the pressing member 233 without interfering with the pressing member 233, when the robot hand 102 is placed on the distal end of the robot arm 101.

The positioning operation of the robot hand 102 performed from the state of FIG. 4A to the state of FIG. 4B will be specifically described. The positioning pin 281 includes a cylindrical straight portion 2811, and a truncated-cone tapered portion 2812 joined with the straight portion 2811. The straight portion 2811 is a first straight portion, and the tapered portion 2812 is a first tapered portion. The positioning pin 282 includes a cylindrical straight portion 2821, and a truncated-cone tapered portion 2822 joined with the straight portion 2821. The straight portion 2821 is a second straight portion, and the tapered portion 2822 is a second tapered portion. When the base ends of the tapered portions 2812 and 2822, that is, the straight portions 2811 and 2821 are located at positions at which they start to fit in the positioning holes 271 and 272, the positioning of the tool plate 202 with respect to the master plate 201 in the X direction and the Y direction is completed. With the positioning operation, the flat surface 212 becomes parallel to the flat surface 211. When the positioning of the tool plate 202 with respect to the master plate 201 in the X direction and the Y direction is completed, the contacts 262 are located at positions at which the contacts 262 almost contact the contacts 261. In this state, the robot hand 102 is further pushed toward the Z1 direction. As a result, as illustrated in FIG. 4B, the plurality of contacts 262 of the connector 252 contact the plurality of contacts 261 of the connector 251, almost simultaneously. Thus, the connector 252 can be prevented from being tilted with respect to the connector 251. In addition, since the contacts 262 are positioned with respect to the contacts 261, the connector 251 and the connector 252 can be stably connected to each other. With such a positioning mechanism, the robot hand 102 can be attached with high reproducibility. Since the robot hand 102 is attached with high reproducibility, the teach time for the attached robot hand can be reduced.

Figure 5A:
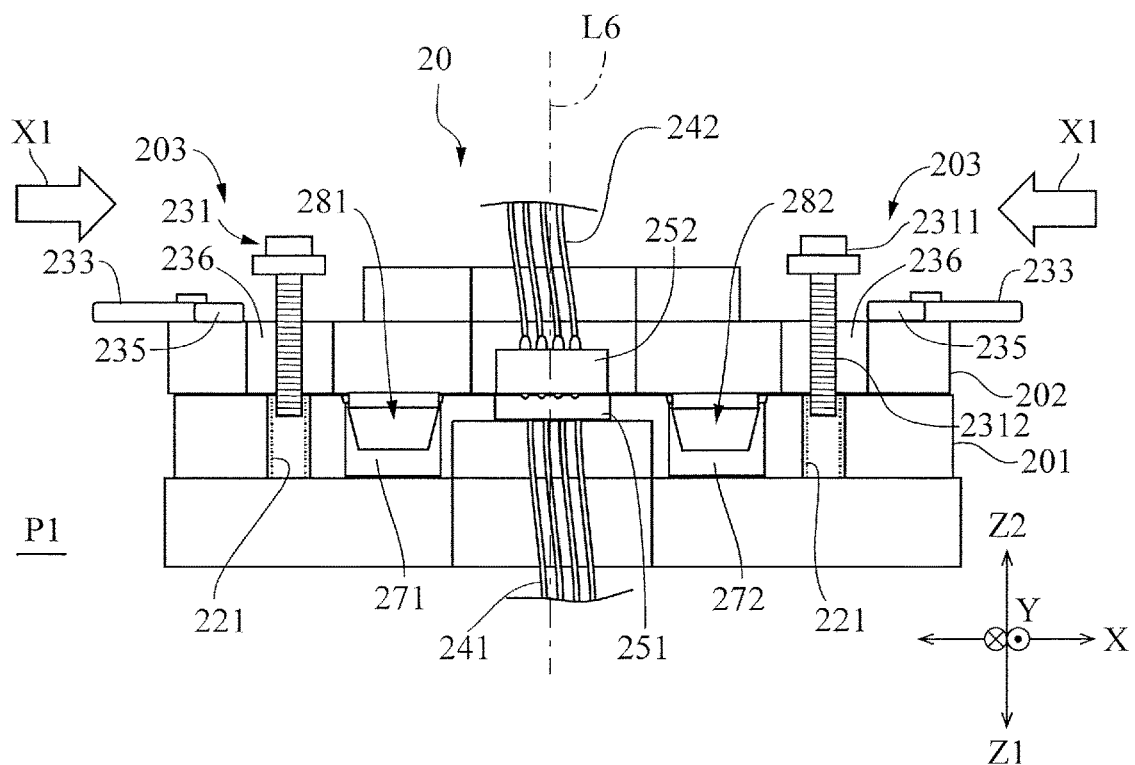
FIG. 5A is a diagram for illustrating the method of the first embodiment, for attaching the robot hand to the robot arm.
Figure 5B:
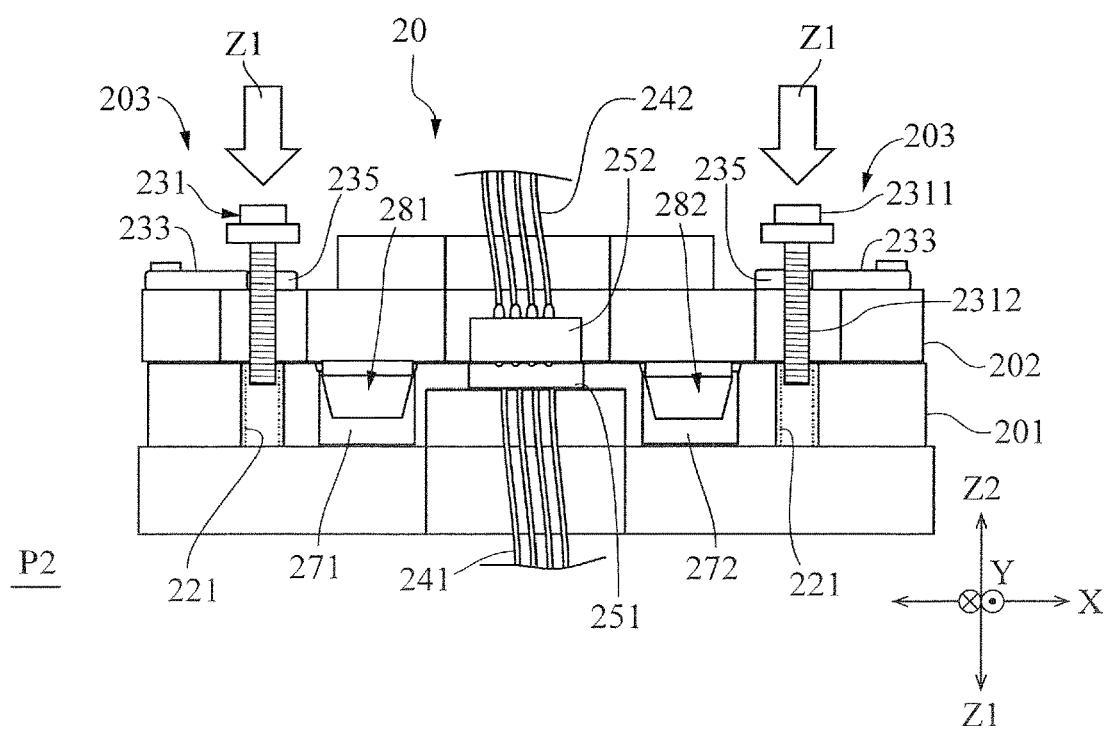
FIG. 5B is a diagram for illustrating the method of the first embodiment, for attaching the robot hand to the robot arm.

Then, the pressing member 233 of each of the fastening mechanisms 203 is slid in an X1 direction, as illustrated in FIG. 5A, to move the pressing member 233 to the engagement position P2 illustrated in FIG. 3B. The X1 direction is a direction that extends toward the rotation axis L6, which is the center of rotation, and that is orthogonal to the Z1 direction. With this operation, as illustrated in FIG. 5B, the shaft portion 2312 of the bolt 231 fits in the cutout 235 of the pressing member 233, and the top portion 2311 of the bolt 231 engages with the pressing member 233 so as not to pass through the through-hole 236. When viewed in the Z1 direction, the pressing member 233 located at the engagement position P2 covers part of the through-hole 236. When the bolt 231 is tightened in the state where the pressing member 233 is located at the engagement position P2, the bolt 231 presses the pressing member 233 and the tool plate 202 toward the Z1 direction, fastening the tool plate 202 to the master plate 201. That is, when the bolt 231 is tightened, the top portion 2311 of the bolt 231 contacts the pressing member 233, and presses the pressing member 233 toward the Z1 direction. In addition, when the bolt 231 is tightened, the pressing member 233 is pressed against the tool plate 202, and the tool plate 202 is sandwiched between the master plate 201 and the pressing member 233. That is, when the tool plate 202 is pressed by the pressing member 233 toward the Z1 direction, the tool plate 202 pressure-contacts the master plate 201, so that the robot hand 102 is attached to the robot arm 101.

When the robot hand 102 is detached from the robot arm 101, the operations will be performed in reverse order. That is, the bolt 231 is loosened, and the pressing member 233 is slid and retracted to the retraction position P1 illustrated in FIG. 3A, at which the pressing member 233 does not interfere with the top portion 2311 of the bolt 231. Also in the case where the robot hand 103 of FIG. 1 is attached to the robot arm 101, the same operations may be performed. That is, the robot hand 103 may have the same components as those of the interface device 20 of the robot hand 102. In the present embodiment, the hand body of the robot hand 103 may have the tool plate 202 and the pressing member 233. The bolt 231 can be used for a plurality of end effectors that can be attached to the robot arm 101. When the robot hand 102 or 103 is detached from the robot arm 101, the bolt 231 has only to be loosened to the extent that the pressing member 233 can be slid. Thus, it is unnecessary to remove the bolt 231 from the robot arm 101. Consequently, the robot hand can be easily replaced. In addition, the bolt 231 fixed to the master plate 201 also functions so as to roughly position the robot hand 102 with respect to the robot arm 101, facilitating the replacement of the robot hand.

In the first embodiment, since the robot hand 102 or 103 can be joined with the robot arm 101 via the interface device 20, the replacement of the robot hand can be performed easily and quickly. In addition, the robot hand 102 or 103 is attached with high reproducibility, the electrical connection between the contacts 261 and the contacts 262 is stabilized, and the durability of the robot apparatus 100 is increased. In addition, the changeover of the robot apparatus 100, which is an automatic assembling machine disposed in a production line, can be performed easily and quickly.

In a modification of the robot hand, the size of the palm unit 121 in the Z direction may be reduced for downsizing the robot hand. In this case, the hand body 1020 and the through-hole 236 are disposed closer to each other. When the hand body 1020 covers part of the through-hole 236 as illustrated in FIG. 2B, not an ordinary screwdriver but an L-shaped screwdriver may be used. In general, the L-shaped screwdriver involves much labor when turned many times. In the present embodiment, however, since the robot hand can be detached by slightly loosening the bolt 231, it is unnecessary to turn the L-shaped screwdriver many times. Thus, the present embodiment produces its effect especially when the bolt 231 is tightened and loosened by using an L-shaped screwdriver.

Second Embodiment

Figure 6:
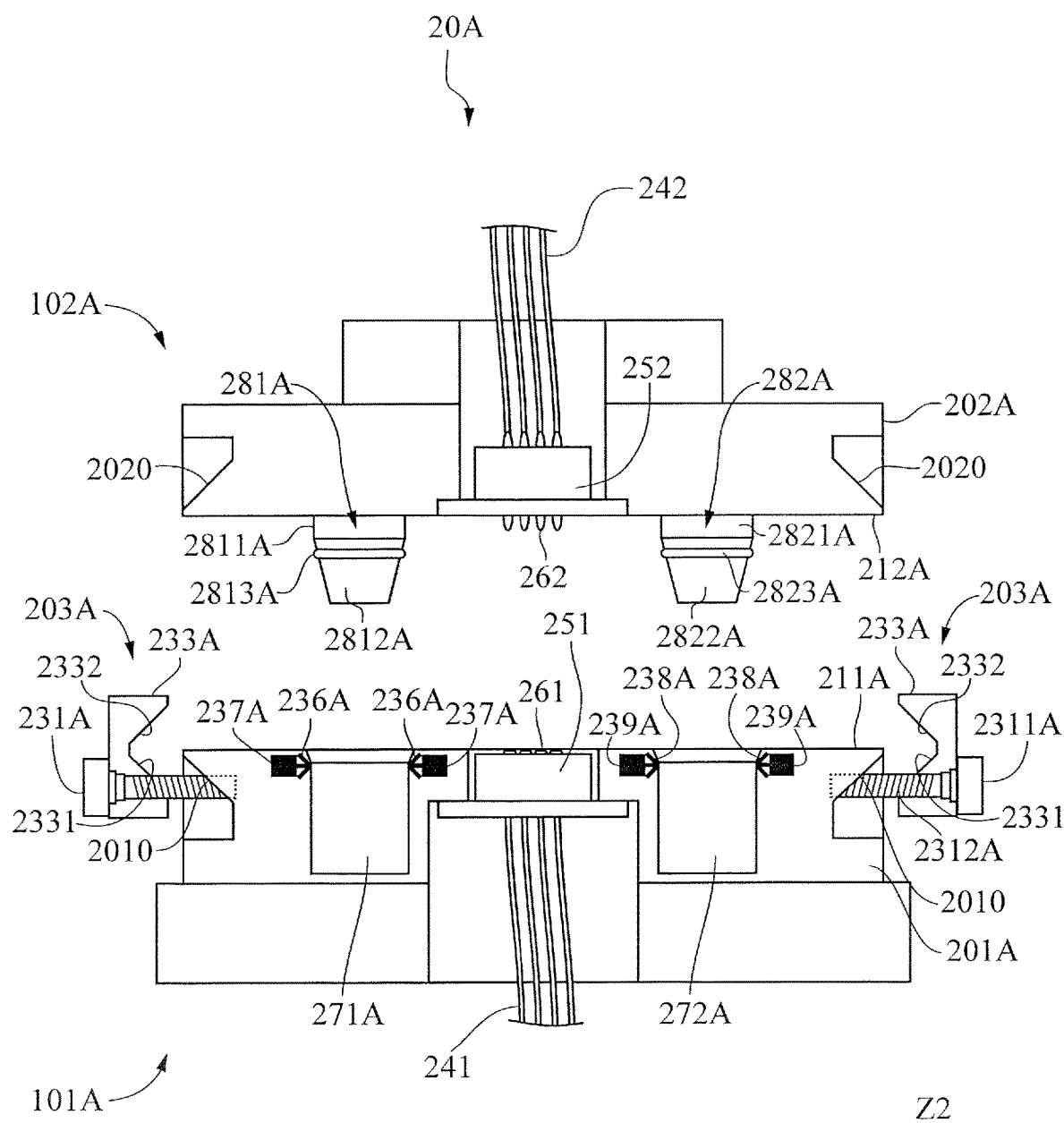
FIG. 6 is a diagram illustrating an interface device of a robot apparatus of a second embodiment.

Next, an interface device of a second embodiment, which is an attaching mechanism of a robot apparatus, will be described. FIG. 6 is a diagram illustrating an interface device 20A of a robot apparatus of the second embodiment. FIG. 6 schematically illustrates a cross section of the interface device 20A. The robot apparatus of the second embodiment includes a robot arm 101A and a robot hand 102A. The robot hand 102A is one example of end effectors, and can be detachably attached to the robot arm 101A. Since the robot arm body and the hand body, which is an end effector body, are the same as those of the first embodiment, the description thereof will be omitted.

As illustrated in FIG. 6, the interface device 20A, which is an attaching mechanism of the second embodiment, includes a master plate 201A that is a first member, and a tool plate 202A that is a second member. The master plate 201A is fixed to the link 116 of the robot arm body 1010 of FIG. 1. The tool plate 202A is fixed to the palm unit 121 of the hand body 1020 of FIG. 1. The master plate 201A includes a flat surface 211A that is a first main surface. The tool plate 202A includes a flat surface 212A that is a second main surface. The flat surface 212A can abut against the flat surface 211A of the master plate 201A.

As in the first embodiment, the connector 251 is fixed to the master plate 201A, and the connector 252 is fixed to the tool plate 202A. The master plate 201A includes a hollow portion in which the connector 251 is disposed. The tool plate 202A includes a hollow portion in which the connector 252 is disposed.

Figure 7:
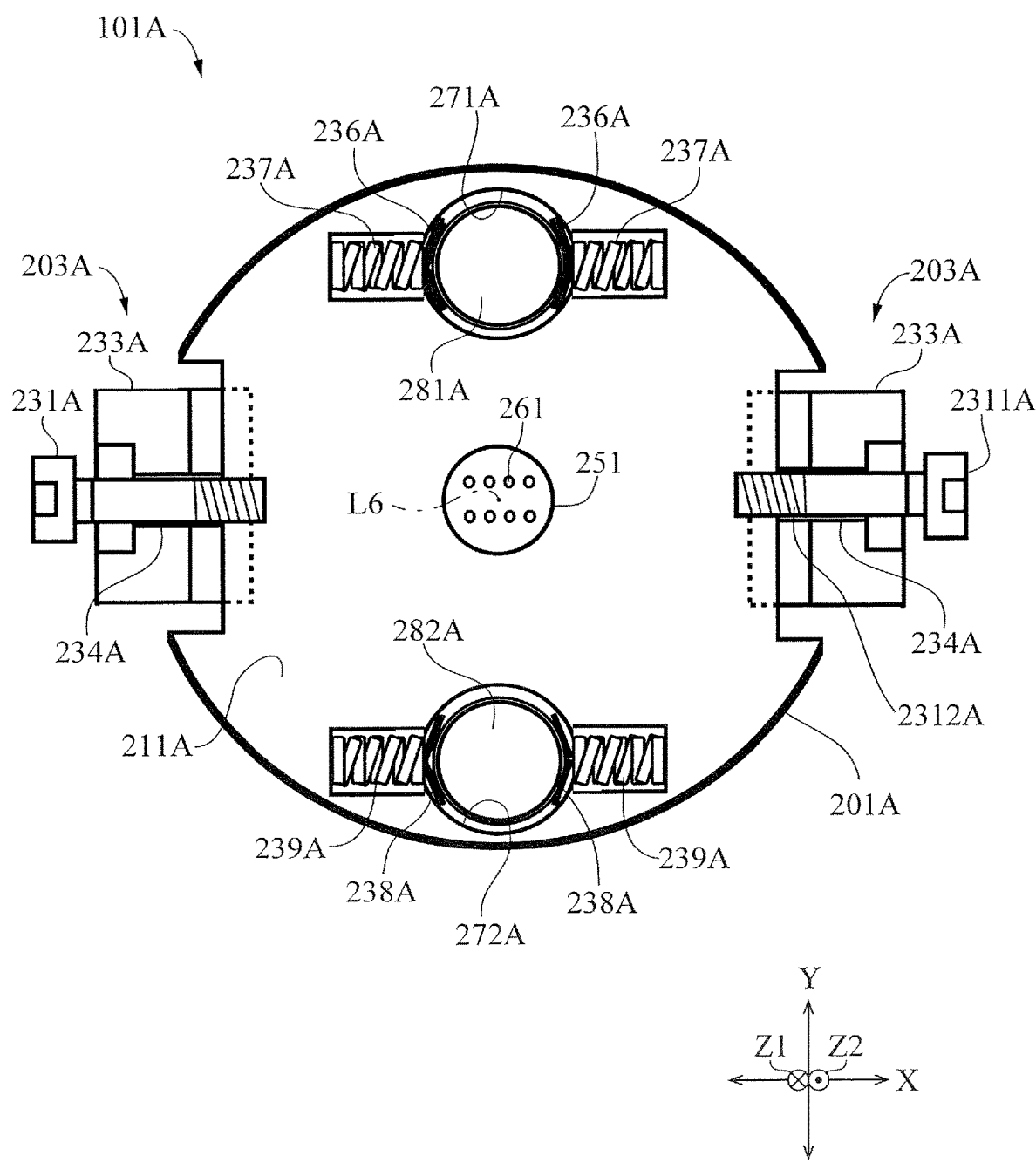
FIG. 7 is a plan view of a distal end of a robot arm of the second embodiment.

FIG. 7 is a plan view of a distal end of the robot arm of the second embodiment. As in the first embodiment, the connector 251 is disposed on the rotation axis L6. When the connector 252 illustrated in FIG. 6 is attached to the connector 251, the connector 252 is also disposed on the rotation axis L6. Consequently, even when the robot arm 101A is moved at high speed, the contact state between the contacts 261 and the contacts 262, that is, the contact pressure between the contacts 261 and the contacts 262 can be kept, so that the electrical connection between the contacts 261 and the contacts 262 can be stabilized. Since the electrical connection between the contacts 261 and the contacts 262 can be stabilized, noise and instantaneous power interruption can be prevented from occurring, so that the frequency of emergency stop of the robot apparatus can be reduced. Therefore, the productivity of products manufactured by the robot apparatus can be increased.

As illustrated in FIG. 6, the interface device 20A includes fastening mechanisms 203A that can fasten the tool plate 202A to the master plate 201A in a state where the flat surface 212A abuts against the flat surface 211A. In the present embodiment, the interface device 20A includes two fastening mechanisms 203A, for example.

Each of the fastening mechanisms 203A includes a wedge member 233A that is a fourth member. The wedge member 233A holds the master plate 201A and the tool plate 202A, and thereby can join the master plate 201A and the tool plate 202A.

Each of the fastening mechanisms 203A also includes a bolt 231A. The bolt 231A may be fixed to the master plate 201A or the tool plate 202A, as one example of fastening members to fasten the wedge member 233A to the master plate 201A or the tool plate 202A. In the present embodiment, the bolt 231A is fixed to the master plate 201A such that the bolt 231A can be separated from the master plate 201A. The master plate 201A includes a screw hole into which the bolt 231A is screwed. As illustrated in FIG. 7, the wedge member 233A has a through-hole 234A through which a shaft portion 2312A of the bolt 231A passes. That is, the through-hole 234A is larger than the shaft portion 2312A of the bolt 231A, and smaller than a top portion 2311A of the bolt 231A. When the bolt 231A is rotated in a direction in which the bolt 231A is tightened, the wedge member 233A is pressed by the top portion 2311A of the bolt 231A. When the wedge member 233A is pressed by the top portion 2311A of the bolt 231A, the wedge member 233A abuts against the master plate 201A and the tool plate 202A, and holds the master plate 201A and the tool plate 202A. Thus, the bolt 231A allows the wedge member 233A to abut against the master plate 201A and the tool plate 202A, and to hold the master plate 201A and the tool plate 202A. In FIG. 7, part of the wedge member 233A is illustrated in a cross section, for convenience of description.

As illustrated in FIG. 6, the wedge member 233A is supported by the bolt 231A such that when the bolt 231A is loosened in a state where the bolt 231A has been screwed into the screw hole of the master plate 201A, the wedge member 233A can retract to a position that allows the master plate 201A and the tool plate 202A to be in contact with or separated from each other. Thus, even when the bolt 231A is not removed from the master plate 201A, the wedge member 233A can be prevented from interfering with the tool plate 202A that is being in contact with or separated from the master plate 201A.

The wedge member 233A includes a pair of sloped surfaces 2331 and 2332, which form a wedge. The master plate 201A includes a sloped surface 2010 that is a first sloped surface formed on the side-wall surface of the master plate 201A. The sloped surface 2331 of the wedge member 233A can abut against the sloped surface 2010. The tool plate 202A includes a sloped surface 2020 that is a second sloped surface formed on the side-wall surface of the tool plate 202A. The sloped surface 2332 of the wedge member 233A can abut against the sloped surface 2020.

In the present embodiment, the wedge member 233A is supported by the bolt 231A such that the wedge member 233A can slide along the shaft portion 2312A of the bolt 231A. The wedge member 233A slides along the shaft portion 2312A of the bolt 231A, and then the sloped surface 2331 of the wedge member 233A abuts against the sloped surface 2010 of the master plate 201A. If the tool plate 202A is located close to the master plate 201A, the wedge member 233A slides along the shaft portion 2312A of the bolt 231A, and then the sloped surface 2332 of the wedge member 233A abuts against the sloped surface 2020 of the tool plate 202A.

Here, the bolt 231A and the wedge member 233A may be disposed on the tool plate 202A. In this case, however, the bolt 231A and the wedge member 233A are required to be disposed on each of a plurality of end effectors that are intended to be replaced. Thus, the bolt 231A and the wedge member 233A are preferably disposed on the master plate 201A. Disposing the bolt 231A and the wedge member 233A on the master plate 201A can eliminate the need of replacing the bolt 231A and the wedge member 233A when a corresponding end effector is replaced, and can reduce the number of components.

One of the master plate 201A and the tool plate 202A, that is, the tool plate 202A in the present embodiment has positioning pins 281A and 282A. The positioning pin 281A is a first positioning pin that protrudes from the flat surface 212A, and the positioning pin 282A is a second positioning pin that protrudes from the flat surface 212A. The positioning pins 281A and 282A are disposed outside the connector 252 in the radial direction. That is, since a center portion of the tool plate 202A is a hollow portion in which the connector 252 and the lines 242 are disposed, the positioning pins 281A and 282A are disposed around the hollow portion. The positioning pins 281A and 282A are rotationally symmetric such that the positioning pins 281A and 282A change places with each other when rotated around the rotation axis L6 (FIG. 7) by 180 degrees. In FIG. 7, for convenience of description, the positioning pins 281A and 282A are illustrated in a state where the positioning pins 281A and 282A are cut from the tool plate 202A.

The other of the master plate 201A and the tool plate 202A, that is, the master plate 201A in the present embodiment has positioning holes 271A and 272A. The positioning hole 271A is a first positioning hole in which the positioning pin 281A fits, and the positioning hole 272A is a second positioning hole in which the positioning pin 282A fits. The positioning holes 271A and 272A are concave with respect to the flat surface 211A. The positioning holes 271A and 272A are disposed outside the connector 251 in the radial direction. That is, since a center portion of the master plate 201A is a hollow portion in which the connector 251 and the lines 241 are disposed, the positioning holes 271A and 272A are disposed around the hollow portion. The positioning holes 271A and 272A are rotationally symmetric such that the positioning holes 271A and 272A change places with each other when rotated around the rotation axis L6 by 180 degrees. When the positioning pins 281A and 282A fit in the positioning holes 271A and 272A, the tool plate 202A is positioned with respect to the master plate 201A with high accuracy, and the connector 252 is positioned with respect to the connector 251 with high accuracy. The tool plate 202A positioned in this manner is fastened and fixed to the master plate 201A via the fastening mechanisms 203A. As a result, the electrical connection between the contacts 261 and the contacts 262 can be stabilized.

The positioning pin 281A includes a cylindrical straight portion 2811A, and a truncated-cone tapered portion 2812A joined with the straight portion 2811A. The straight portion 2811A is a first straight portion, and the tapered portion 2812A is a first tapered portion. The positioning pin 281A further includes a protruding portion 2813A formed on the tapered portion 2812A and protruding in the radial direction. The protruding portion 2813A is a first protruding portion. The positioning pin 282A includes a cylindrical straight portion 2821A, and a truncated-cone tapered portion 2822A joined with the straight portion 2821A. The straight portion 2821A is a second straight portion, and the tapered portion 2822A is a second tapered portion. The positioning pin 282A further includes a protruding portion 2823A formed on the tapered portion 2822A and protruding in the radial direction. The protruding portion 2823A is a second protruding portion.

The protruding portion 2813A is formed along the circumferential direction of the tapered portion 2812A, and functions as a stopper in the positioning hole 271A. The protruding portion 2823A is formed along the circumferential direction of the tapered portion 2822A, and functions as a stopper in the positioning hole 272A. The diameter of the protruding portion 2813A is the same as that of the straight portion 2811A, and the diameter of the protruding portion 2823A is the same as that of the straight portion 2821A.

In the inner wall of the positioning hole 271A, a pair of engagement pins 236A is disposed. The pair of the engagement pins 236A is a first engagement member disposed so as to be able to move into or from the positioning hole 271A. Each element of the pair of engagement pins 236A is urged toward a center of the positioning hole 271A by an urging spring 237A that is a first urging member. Specifically, each element of the pair of engagement pins 236A is urged so as to reach the positioning hole 271A, that is, a position of the positioning hole 271A at which the element of the pair of engagement pins 236A engages with the protruding portion 2813A.

In the inner wall of the positioning hole 272A, a pair of engagement pins 238A is disposed. The pair of the engagement pins 238A is a second engagement member disposed so as to be able to move into or from the positioning hole 272A. Each element of the pair of engagement pins 238A is urged toward a center of the positioning hole 272A by an urging spring 239A that is a second urging member. Specifically, each element of the pair of engagement pins 238A is urged so as to reach the positioning hole 272A, that is, a position of the positioning hole 272A at which the element of the pair of engagement pins 238A engages with the protruding portion 2823A.

Next, a method for attaching the robot hand 102A to the robot arm 101A will be described in detail. FIGS. 8A, 8B, 9A, and 9B are diagrams for illustrating the method of the second embodiment, for attaching the robot hand 102A to the robot arm 101A. FIGS. 8A, 8B, 9A, and 9B schematically illustrate a cross section of the interface device 20A.

Figure 8A:
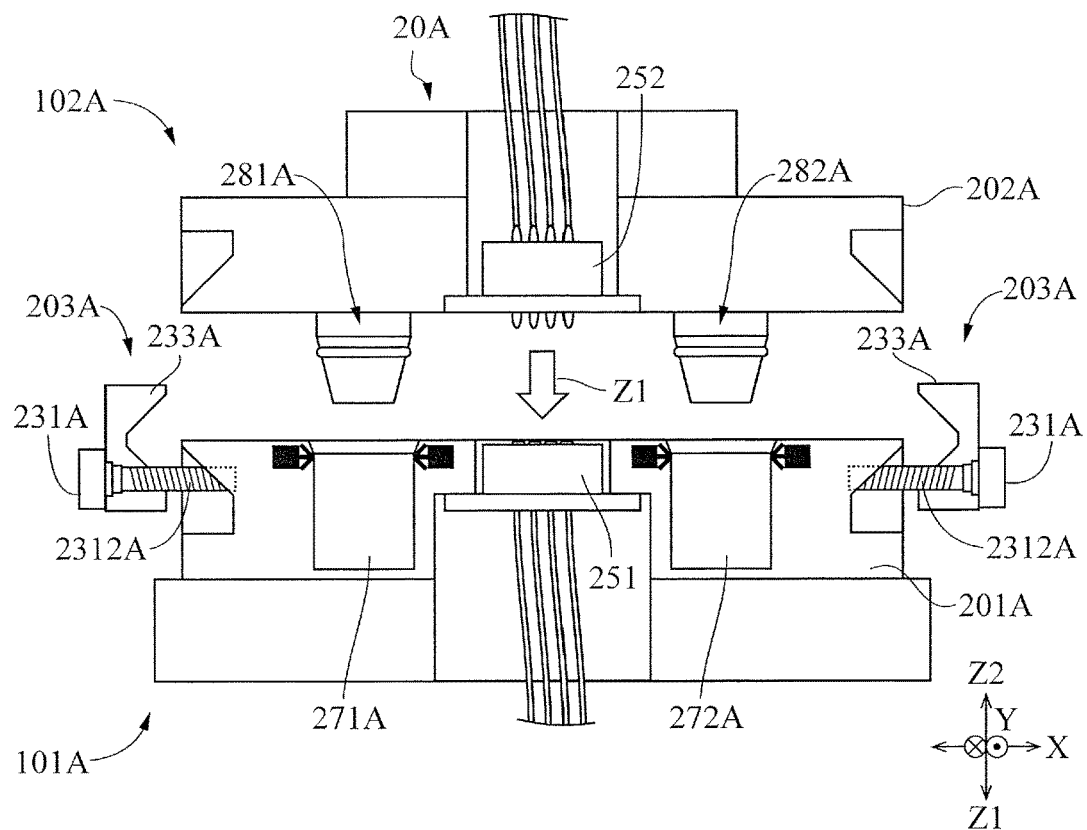
FIG. 8A is a diagram for illustrating a method of the second embodiment, for attaching a robot hand to the robot arm.
Figure 8B:
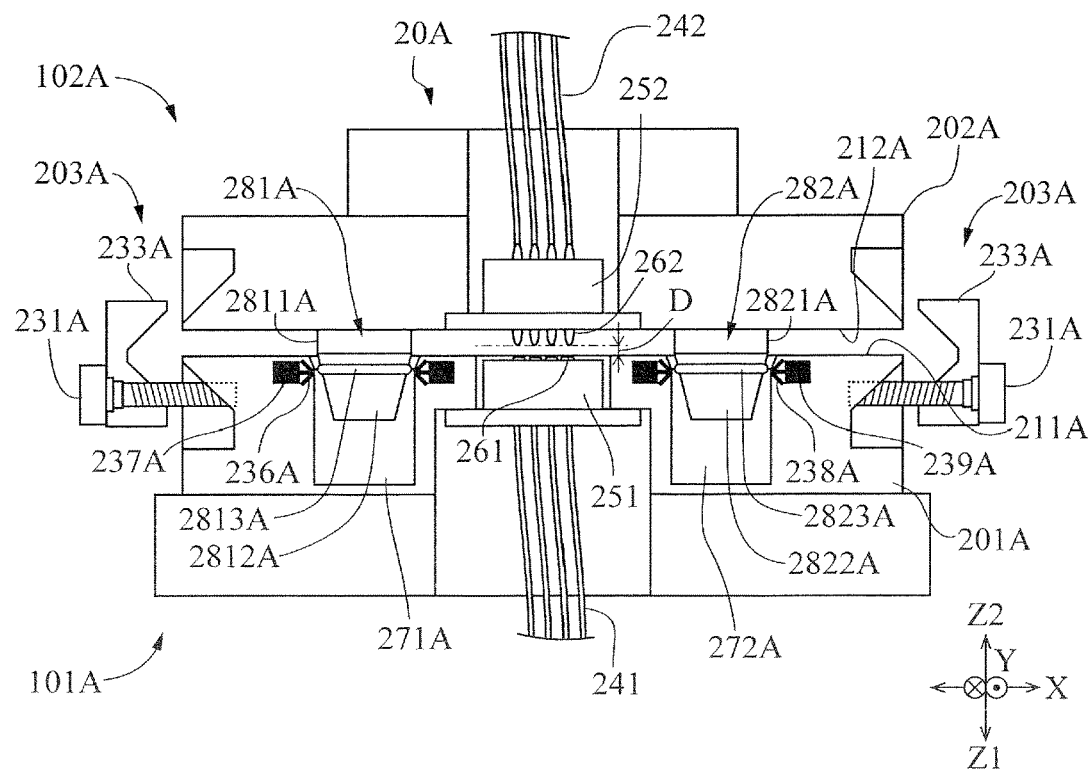
FIG. 8B is a diagram for illustrating the method of the second embodiment, for attaching the robot hand to the robot arm.

As illustrated in FIG. 8A, the positioning pins 281A and 282A of the tool plate 202A of the robot hand 102A are positioned so as to face the positioning holes 271A and 272A of the master plate 201A of the robot arm 101A. The bolt 231A screwed into the screw hole of the master plate 201A has been loosened. The wedge member 233A can move along the shaft portion 2312A of the bolt 231A, between a position at which the wedge member 233A does not interfere with the tool plate 202A, and a position at which the wedge member 233A abuts against the master plate 201A and the tool plate 202A. In this time, the wedge member 233A is located at the position at which the wedge member 233A does not interfere with the tool plate 202A. Then, the robot hand 102A, that is, the tool plate 202A is moved toward the Z1 direction to insert the positioning pins 281A and 282A of the tool plate 202A into the positioning holes 271A and 272A of the master plate 201A, as illustrated in FIG. 8B.

Then, the protruding portion 2813A of the positioning pin 281A engages with the engagement pins 236A that reach the positioning hole 271A, and the protruding portion 2823A of the positioning pin 282A engages with the engagement pins 238A that reach the positioning hole 272A. Thus, the robot hand 102A is supported by the engagement pins 236A and 238A. When the protruding portion 2813A engages with the engagement pins 236A, and the protruding portion 2823A engages with the engagement pins 238A, the positioning of the robot hand 102A, that is, of the tool plate 202A in the X direction and the Y direction is almost completed, and the tilt of the robot hand 102A is corrected. In this time, the robot hand 102A is held, with a clearance D in which the contacts 262 of the robot hand 102A and the contacts 261 of the robot arm 101A do not contact each other. Hereinafter, this state is referred to as a temporary positioning state. When the robot hand 102A, that is, the tool plate 202A is in the temporary positioning state, the tilt of the tool plate 202A with respect to the master plate 201A is corrected, and thus the flat surface 212A becomes almost parallel to the flat surface 211A.

Figure 9A:
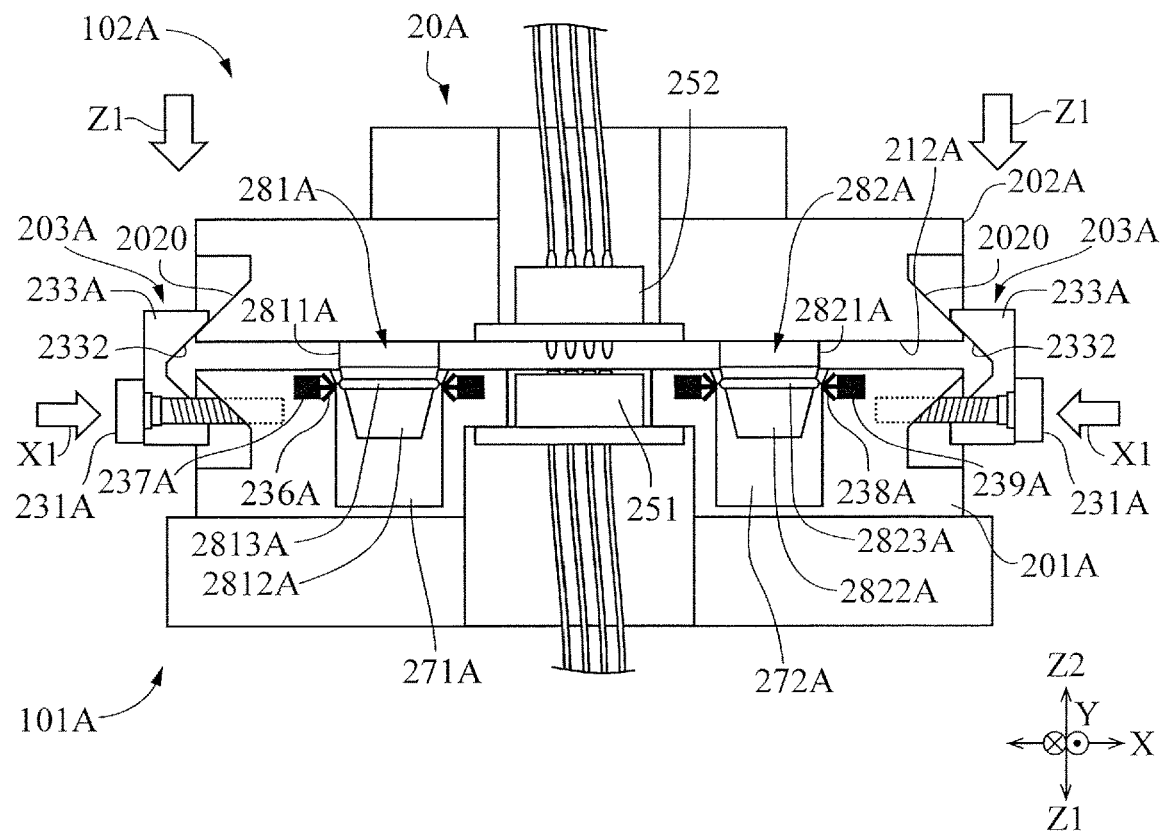
FIG. 9A is a diagram for illustrating the method of the second embodiment, for attaching the robot hand to the robot arm.

Then the bolt 231A is rotated in a direction in which the bolt 231A is tightened, the bolt 231A and the wedge member 233A moves in the X1 direction as illustrated in FIG. 9A, and the sloped surface 2332 of the wedge member 233A abuts against the sloped surface 2020 of the tool plate 202A in the X1 direction. The tightening force of the bolt 231A causes the sloped surface 2332 of the wedge member 233A to press the sloped surface 2020 of the tool plate 202A toward the Z1 direction, while moving the whole of the robot hand 102A toward the Z1 direction. When the robot hand 102A in the temporary positioning state is pushed toward the Z1 direction, the protruding portions 2813A and 2823A that are moving in the downward direction push the engagement pins 236A and 238A, and cause the engagement pins 236A and 238A to retract outward in the radial direction, against the urging force of the urging springs 237A and 239A.

When the base ends of the tapered portions 2812A and 2822A, that is, the straight portions 2811A and 2821A are located at positions at which they start to fit in the positioning holes 271A and 272A, the positioning of the tool plate 202A with respect to the master plate 201A in the X direction and the Y direction is completed.

Figure 9B:
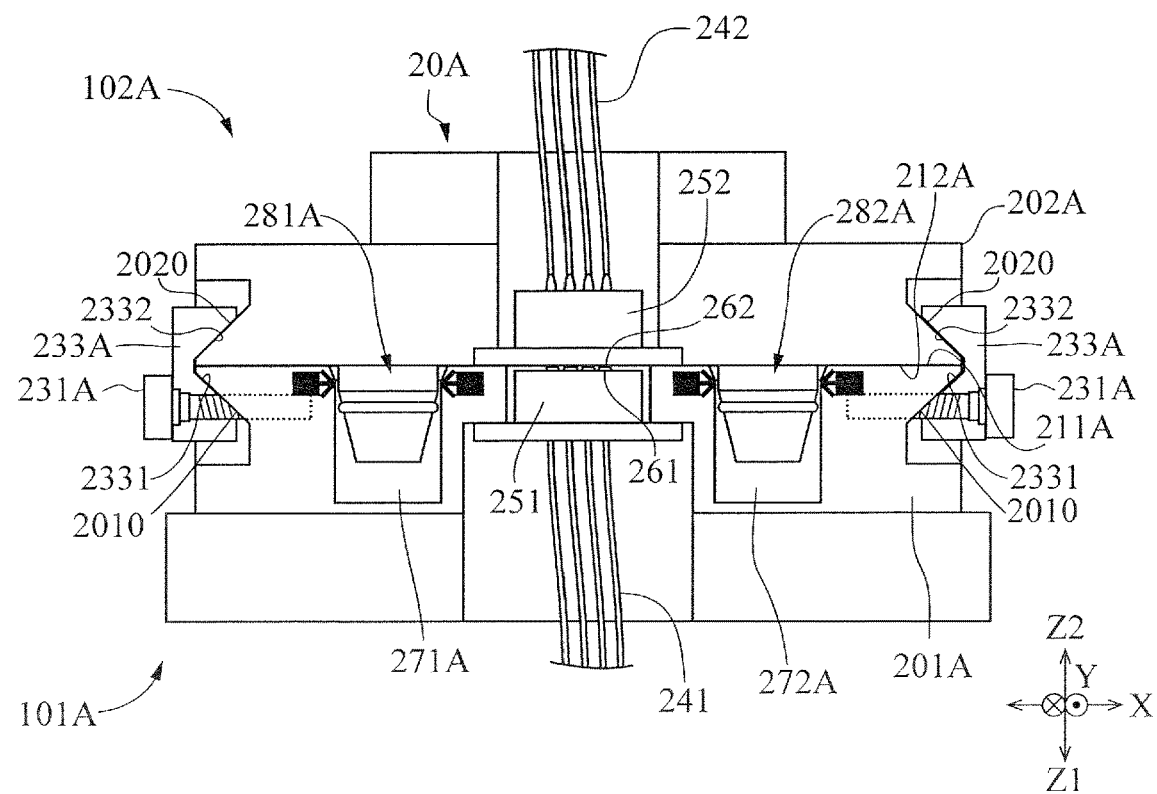
FIG. 9B is a diagram for illustrating the method of the second embodiment, for attaching the robot hand to the robot arm.

When the bolt 231A is further rotated in a direction in which the bolt 231A is tightened, the tool plate 202A is further pushed toward the Z1 direction. As illustrated in FIG. 9B, the sloped surface 2331 of the wedge member 233A abuts against the sloped surface 2010 of the master plate 201A, the master plate 201A and the tool plate 202A is held by the wedge member 233A, and the flat surface 211A and the flat surface 212A closely contact each other. Since the tilt of the connector 252 is corrected before the contacts 262 contact the contacts 261, the plurality of contacts 262 of the connector 252 contact the plurality of contacts 261 of the connector 251, almost simultaneously. With this operation, the contacts 262 can be prevented from sliding on the contacts 261 in the X and Y directions, and from wearing. Thus, the durability and the life of the contacts 261 and 262 can be increased.

As described above, the temporary positioning state of the robot hand 102A is made, and then the wedge member 233A is tightened by the bolt 231A of each of the fastening mechanisms 203A, so that the flat surface 211A and the flat surface 212A can closely and uniformly contact each other. As a result, the tightening torque of the bolt 231A of each of the fastening mechanisms 203A can be prevented from varying, regardless of the order of the bolts 231A of the fastening mechanisms 203A to be tightened. Consequently, the replacement of the robot hand can be easily performed, and the robot hand can be attached with high reproducibility. Since the robot hand 102A is attached with high reproducibility, the teach time for the attached robot hand can be reduced.

In addition, since the temporary positioning state of the robot hand 102A is made, contacting the contacts 261 of the connector 251 and the contacts 262 of the connector 252 can be easily performed simultaneously. As a result, the stability and the durability of the electrical connection can be increased. Therefore, the changeover of the automatic assembling machine can be performed easily and quickly.

Third Embodiment

Figure 10:
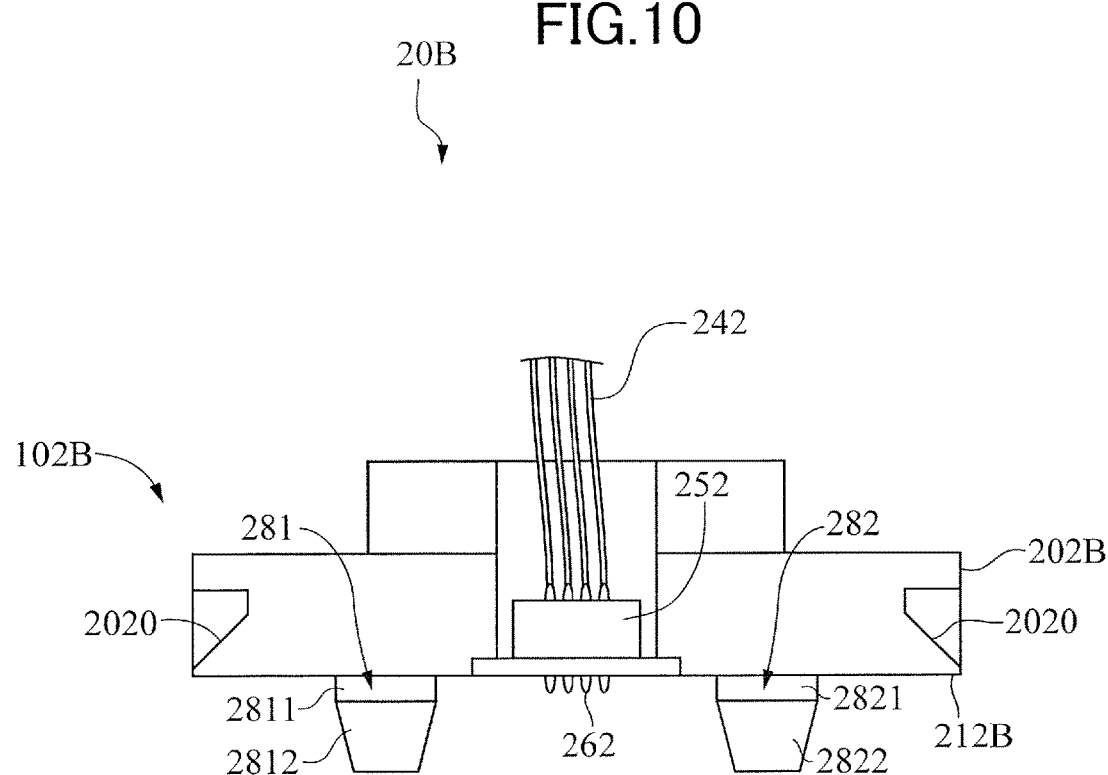
FIG. 10 is a diagram illustrating an interface device of a robot apparatus of a third embodiment.
Figure 10:
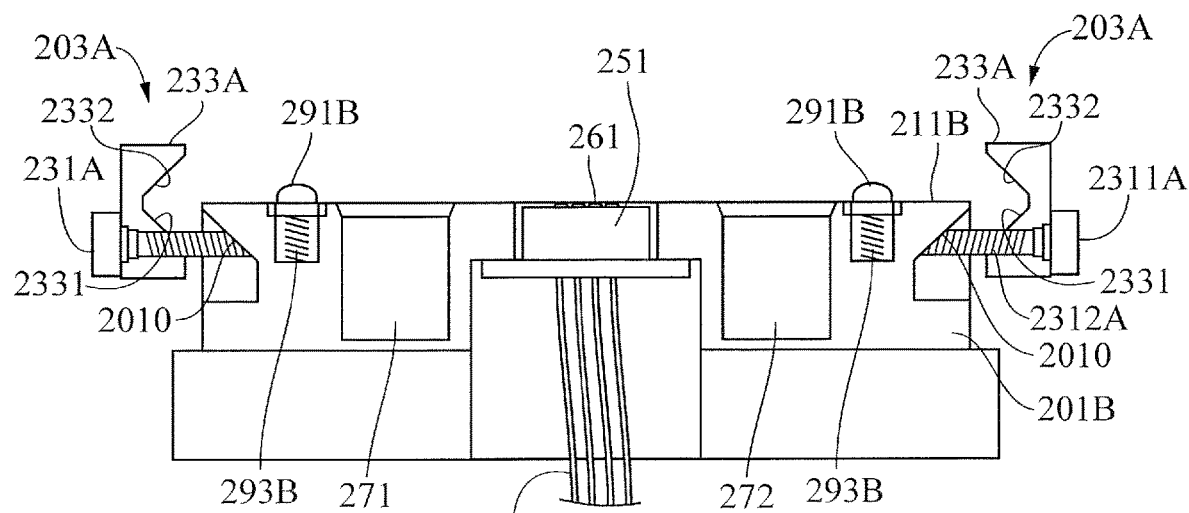
Figure 10:
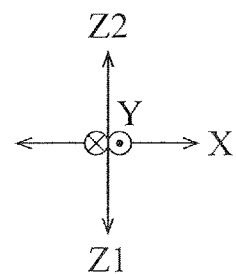

Next, an interface device of a third embodiment, which is an attaching mechanism of a robot apparatus, will be described. FIG. 10 is a diagram illustrating an interface device 20B of a robot apparatus of the third embodiment. FIG. 10 schematically illustrates a cross section of the interface device 20B. The robot apparatus of the third embodiment includes a robot arm 101B and a robot hand 102B. The robot hand 102B is one example of end effectors, and can be detachably attached to the robot arm 101B. Since the robot arm body and the hand body, which is an end effector body, are the same as those of the first embodiment, the description thereof will be omitted.

As illustrated in FIG. 10, the interface device 20B of the third embodiment includes a master plate 201B that is a first member, and a tool plate 202B that is a second member. The master plate 201B is fixed to the link 116 of the robot arm body 1010 of FIG. 1. The tool plate 202B is fixed to the palm unit 121 of the hand body 1020 of FIG. 1. The master plate 201B includes a flat surface 211B that is a first main surface. The tool plate 202B includes a flat surface 212B that is a second main surface. The flat surface 212B can abut against the flat surface 211B of the master plate 201B.

As in the first embodiment, the connector 251 is fixed to the master plate 201B, and the connector 252 is fixed to the tool plate 202B. The master plate 201B includes a hollow portion in which the connector 251 is disposed. The tool plate 202B includes a hollow portion in which the connector 252 is disposed.

Figure 11:
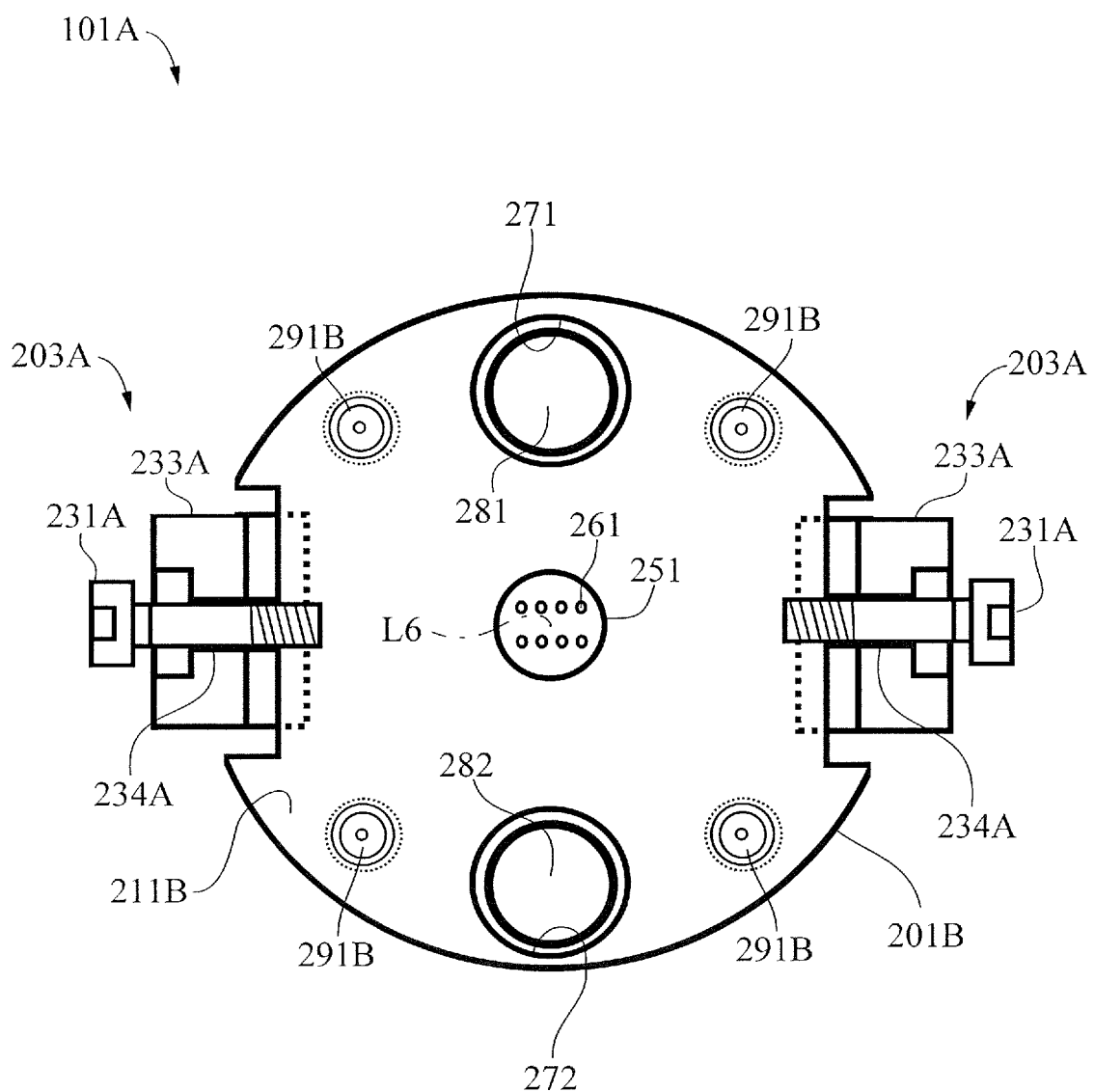
FIG. 11 is a plan view of a distal end of a robot arm of the third embodiment.
Figure 11:
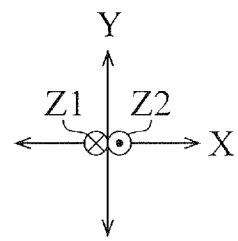

FIG. 11 is a plan view of a distal end of the robot arm of the third embodiment. As in the first embodiment, the connector 251 is disposed on the rotation axis L6. When the connector 252 illustrated in FIG. 10 is attached to the connector 251, the connector 252 is also disposed on the rotation axis L6. Consequently, even when the robot arm 101B is moved at high speed, the contact state between the contacts 261 and the contacts 262, that is, the contact pressure between the contacts 261 and the contacts 262 can be kept, so that the electrical connection between the contacts 261 and the contacts 262 can be stabilized. Since the electrical connection between the contacts 261 and the contacts 262 can be stabilized, noise and instantaneous power interruption can be prevented from occurring, so that the frequency of emergency stop of the robot apparatus can be reduced. Therefore, the productivity of products manufactured by the robot apparatus can be increased.

The interface device 20B includes the fastening mechanisms 203A that are the same as those of the second embodiment. Each of the fastening mechanisms 203A includes the bolt 231A and the wedge member 233A. In FIG. 11, part of the wedge member 233A is illustrated in a cross section, for convenience of description. In the present embodiment, the interface device 20B includes two fastening mechanisms 203A, for example. One of the master plate 201B and the tool plate 202B, that is, the tool plate 202B in the present embodiment has the positioning pins 281 and 282 that protrude from the flat surface 212B, as in the first embodiment. The other of the master plate 201B and the tool plate 202B, that is, the master plate 201B in the present embodiment has the positioning holes 271 and 272, as in the first embodiment. In FIG. 11, for convenience of description, the positioning pins 281 and 282 are illustrated in a state where the positioning pins 281 and 282 are cut from the tool plate 202B.

In the above-described second embodiment, for making the temporary positioning state of the robot hand to the robot arm, the protruding portions are formed on the positioning pins, and the engagement pins and the urging springs are disposed in the positioning holes. In the third embodiment, the master plate 201B has a plurality of (for example, four) abutment pins 291B and a plurality of (for example, four) urging springs 293B. Each of the urging springs 293B is a third urging member that urges a corresponding one of the abutment pins 291B toward the Z2 direction, in which the abutment pins 291B protrude from the flat surface 211B. The spring pressure of each of the urging springs 293B is set to a value at which the contacts 261 of the connector 251 and the contacts 262 of the connector 252 do not contact each other when the robot hand 102B is placed on the abutment pins 291B in the replacement. That is, the urging springs 293B have an identical spring pressure value, and an identical amount of protrusion in the upward direction Z1 and the downward direction Z2.

Next, a method for attaching the robot hand 102B to the robot arm 101B will be described in detail. FIGS. 12A, 12B, 13A, and 13B are diagrams for illustrating the method of the third embodiment, for attaching the robot hand 102B to the robot arm 101B. FIGS. 12A, 12B, 13A, and 13B schematically illustrate a cross section of the interface device 20B.

Figure 12A:
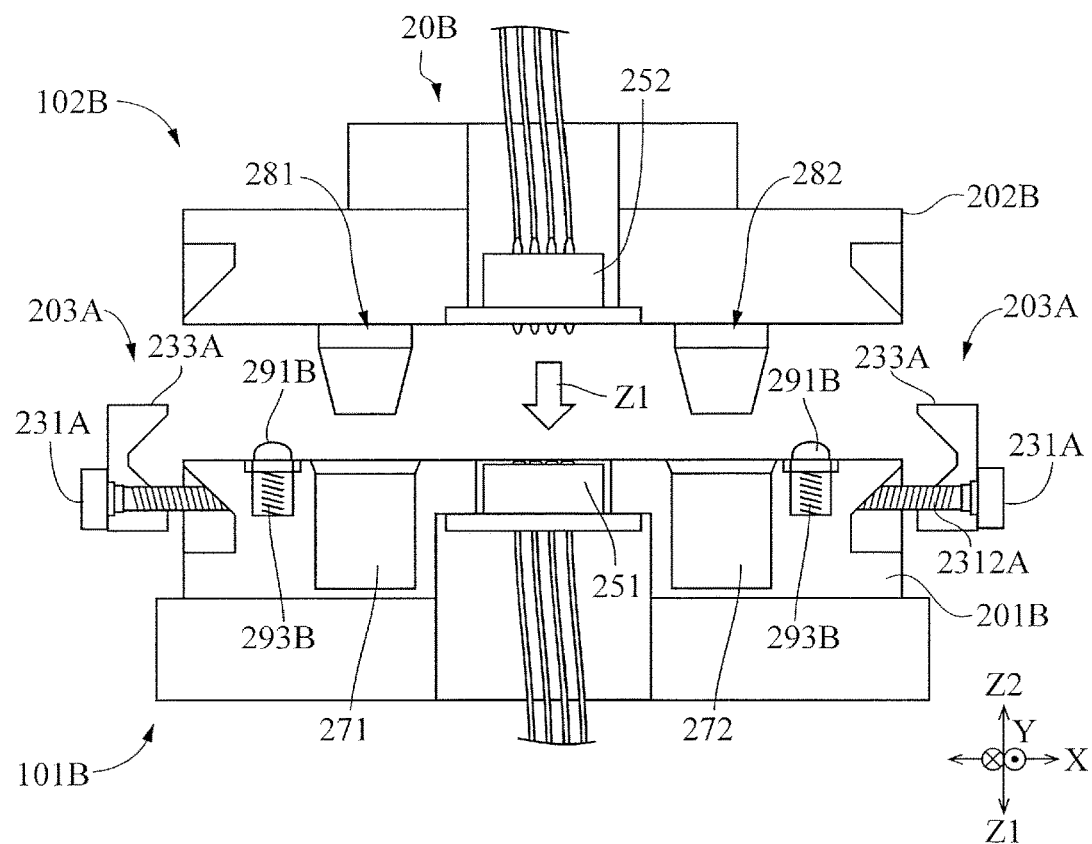
FIG. 12A is a diagram for illustrating a method of the third embodiment, for attaching a robot hand to the robot arm.
Figure 12B:
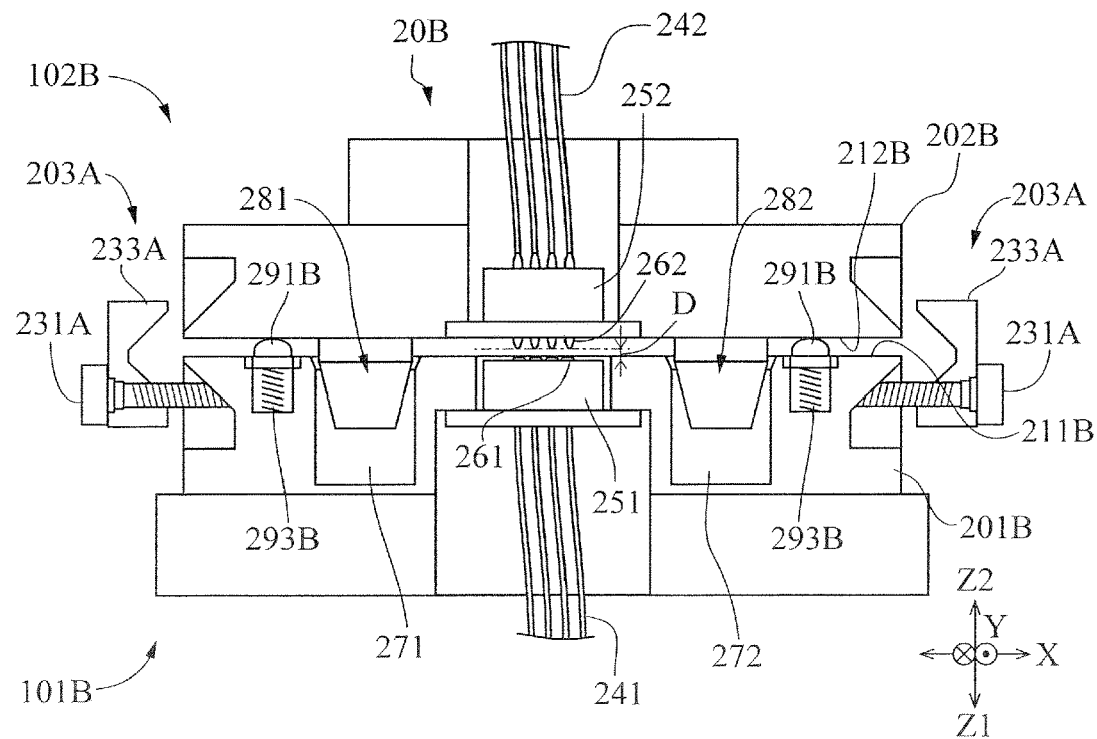
FIG. 12B is a diagram for illustrating the method of the third embodiment, for attaching the robot hand to the robot arm.

As illustrated in FIG. 12A, the positioning pins 281 and 282 of the tool plate 202B of the robot hand 102B are positioned so as to face the positioning holes 271 and 272 of the master plate 201B of the robot arm 101B. The bolt 231A screwed into the screw hole of the master plate 201B has been loosened. The wedge member 233A can move along the shaft portion 2312A of the bolt 231A, between a position at which the wedge member 233A does not interfere with the tool plate 202B, and a position at which the wedge member 233A abuts against the master plate 201B and the tool plate 202B. In this time, the wedge member 233A is located at the position at which the wedge member 233A does not interfere with the tool plate 202B. Then, the robot hand 102B, that is, the tool plate 202B is moved toward the Z1 direction to insert the positioning pins 281 and 282 of the tool plate 202B into the positioning holes 271 and 272 of the master plate 201B, as illustrated in FIG. 12B. When the robot hand 102B is placed on the distal end of the robot arm 101B, that is, when the tool plate 202B is placed on the master plate 201B, the robot hand 102B is supported by the plurality of abutment pins 291B.

When the tapered portion 2812 of the positioning pin 281 fits in the positioning hole 271, and the tapered portion 2822 of the positioning pin 282 fits in the positioning hole 272, the positioning of the robot hand 102B, that is, of the tool plate 202B in the X direction and the Y direction is almost completed. In this time, the plurality of abutment pins 291B abut against the flat surface 212B of the tool plate 202B, and are moved, by the same amount, downward in the Z1 direction by the weight of the robot hand 102B. With this operation, the tilt of the robot hand 102B is corrected. In this time, since the robot hand 102B is supported by the plurality of abutment pins 291B, the robot hand 102B is held, with a clearance D in which the contacts 262 of the robot hand 102B and the contacts 261 of the robot arm 101B do not contact each other. When the robot hand 102B, that is, the tool plate 202B is in the temporary positioning state, the tilt of the tool plate 202B to the master plate 201B is corrected, and thus the flat surface 212B becomes almost parallel to the flat surface 211B.

Figure 13A:
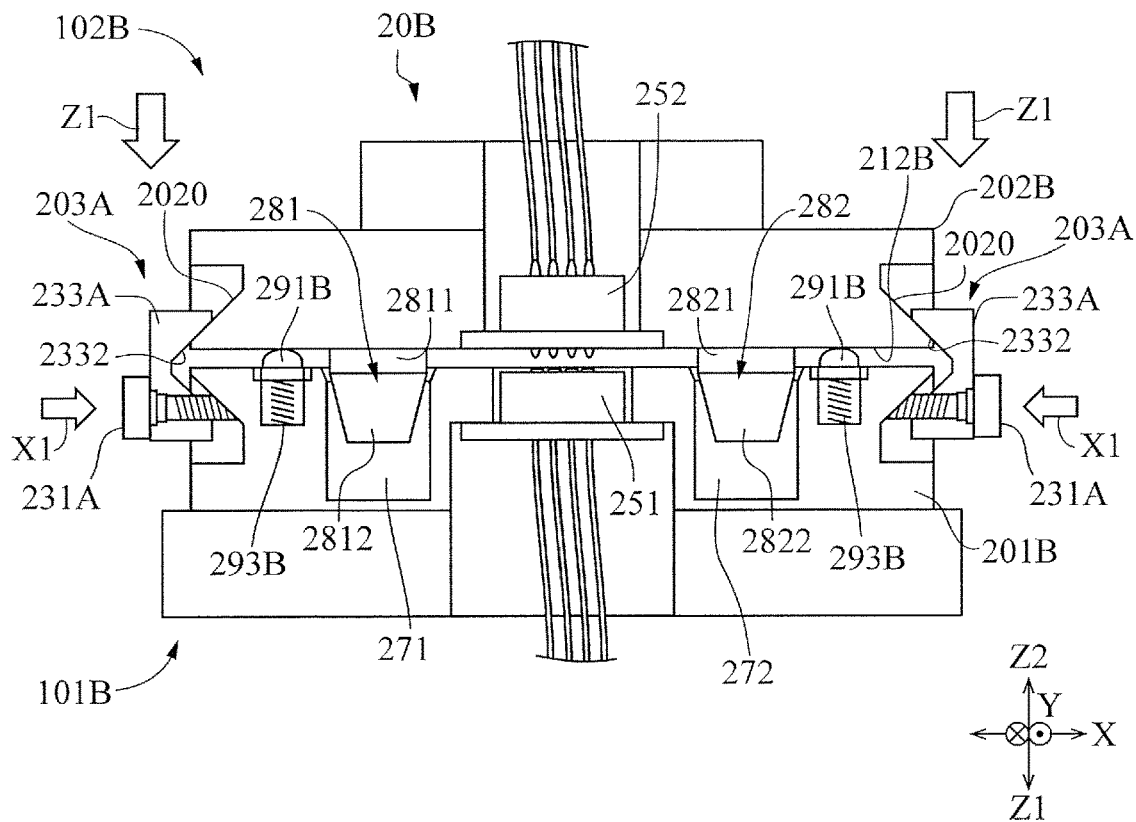
FIG. 13A is a diagram for illustrating the method of the third embodiment, for attaching the robot hand to the robot arm.

Then the bolt 231A is rotated in a direction in which the bolt 231A is tightened, and the sloped surface 2332 of the wedge member 233A abuts against the sloped surface 2020 of the tool plate 202B in the X1 direction, as illustrated in FIG. 13A. The tightening force of the bolt 231A causes the sloped surface 2332 of the wedge member 233A to press the sloped surface 2020 of the tool plate 202B toward the Z1 direction, while moving the whole of the robot hand 102B toward the Z1 direction. When the robot hand 102B in the temporary positioning state is pushed toward the Z1 direction, the abutment pins 291B are pressed and retracted toward the Z1 direction, against the urging force of the urging springs 293B.

When the base ends of the tapered portions 2812 and 2822, that is, the straight portions 2811 and 2821 are located at positions at which they start to fit in the positioning holes 271 and 272, the positioning of the tool plate 202B with respect to the master plate 201B in the X direction and the Y direction is completed.

Figure 13B:
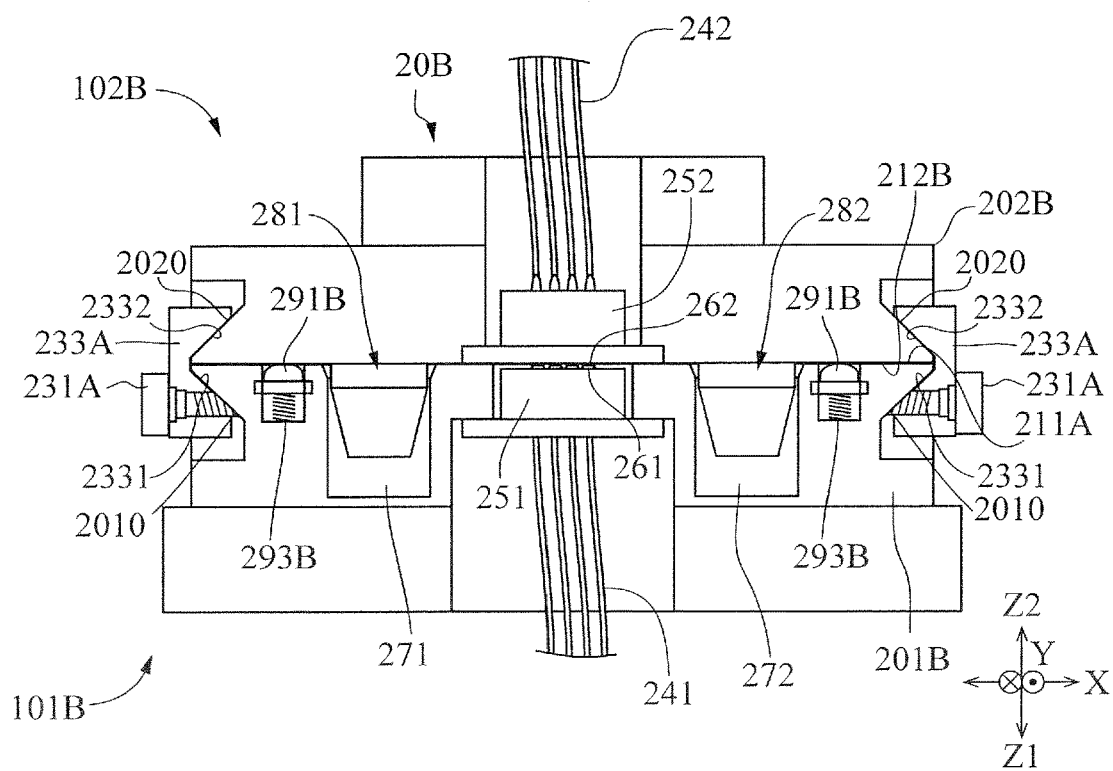
FIG. 13B is a diagram for illustrating the method of the third embodiment, for attaching the robot hand to the robot arm.

When the bolt 231A is further rotated in the direction in which the bolt 231A is tightened, the tool plate 202B is further pushed toward the Z1 direction. As illustrated in FIG. 13B, the sloped surface 2331 of the wedge member 233A abuts against the sloped surface 2010 of the master plate 201B, the master plate 201B and the tool plate 202B are held by the wedge member 233A, and the flat surface 211B and the flat surface 212B closely contact each other. Since the tilt of the connector 252 is corrected before the contacts 262 contact the contacts 261, the plurality of contacts 262 of the connector 252 contact the plurality of contacts 261 of the connector 251, almost simultaneously. With this operation, the contacts 262 can be prevented from sliding on the contacts 261 in the X and Y directions, and from wearing. Thus, the durability and the life of the contacts 261 and 262 can be increased.

As described above, the temporary positioning state of the robot hand 102B is made, and then the wedge member 233A is tightened by the bolt 231A of each of the fastening mechanisms 203A, so that the flat surface 211B and the flat surface 212B can closely and uniformly contact each other. As a result, the tightening torque of the bolt 231A of each of the fastening mechanisms 203A can be prevented from varying, regardless of the order of the bolts 231A of the fastening mechanisms 203A to be tightened. Consequently, the replacement of the robot hand can be easily performed, and the robot hand can be attached with high reproducibility. Since the robot hand 102B is attached with high reproducibility, the teach time for the attached robot hand can be reduced.

In addition, since the temporary positioning state of the robot hand 102B is made, contacting the contacts 261 of the connector 251 and the contacts 262 of the connector 252 can be easily performed simultaneously. As a result, the stability and the durability of the electrical connection can be increased. Therefore, the changeover of the automatic assembling machine can be performed easily and quickly.

Here, although the description has been made for the case where the four abutment pins 291B are used, two or more abutment pins may be used.

The present invention is not limited to the above-described embodiments, and may be variously modified within the technical concept of the present invention. In addition, the effects described in the embodiments are merely the most suitable effects produced by the present invention. Thus, the effects by the present invention are not limited to those described in the embodiments.

In the first to the third embodiments, the description has been made for the case where the vertically articulated robot arm is used. The present disclosure, however, is not limited to this. For example, the interface device of the present invention can be suitably used for various robot arms, including a horizontally articulated robot arm, a parallel-link robot arm, and a Cartesian-coordinate robot arm. In addition, the interface device can be used for various end effectors to be joined with various robot arms.

In the second and the third embodiments, the description has been made for the case where the robot hand is pushed downward in the Z1 direction via the wedge member 233A, by an operator tightening the bolt. However, the robot hand may be pushed downward in the Z1 direction by an operator. In this case, the bolt may be tightened after the robot hand is pushed downward.

In the second and the third embodiments, the description has been made, as an example, for the case where the bolt is used, as a fastening member, for fixing the wedge member to the master plate. However, the fastening member may be not the bolt, but a wire or a buckle.

In the first to the third embodiments, the description has been made for the case where the end effector is a robot hand. The present disclosure, however, is not limited to this. For example, the end effector may be an electric tool, such as tweezers or a driver driven by a motor.

In the first to the third embodiments, the description has been made for the case where the master plate is fixed to the link 116 that is a rotary portion. However, the master plate may be fixed to another member, such as a force sensor (not illustrated), disposed on the distal end of the link 116.

In the first to the third embodiments, the description has been made for the case where the first member is the master plate that can be detachably attached to the rotary portion of the robot arm, such as the link 116. The present disclosure, however, is not limited to this. For example, the first member may be a master plate integrated with the rotary portion. In addition, the description has been made for the case where the second member is the tool plate that can be detachably attached to the end effector body. The present disclosure, however, is not limited to this. For example, the second member may be a tool plate integrated with the end effector body.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-191306, filed Oct. 9, 2018, and Japanese Patent Application No. 2019-153045, filed Aug. 23, 2019, which are hereby incorporated by reference herein in their entirety.

What is claimed is:

1. An attaching mechanism for attaching an end effector to a robot arm, comprising:
   a fastening member;
   a first member provided on the robot arm;
   a fastened portion to which the fastening member is fastened, and which is provided on the first member;
   a second member comprising an insertion portion through which the fastening member passes, and which is provided on the end effector; and
   a third member configured to enable the fastening member to pass through the insertion portion when the third member is located at a first position, and engage with the fastening member and disable the fastening member from passing through the insertion portion when the third member is located at a second position,
   wherein when the third member is located at the first position, the second member is contactable with the first member so that the fastening member passes through the insertion portion in a state where at least one portion of the fastening member has been fastened to the fastened portion, and
   wherein when the third member is located at the second position, the fastening member is configured to be fastened to the fastened portion in a predetermined direction and the third member is pressed by the fastening member, whereby the second member is attached to the first member and the end effector is attached to the robot arm.

2. The attaching mechanism according to claim 1, wherein the third member is disposed on the second member.

3. The attaching mechanism according to claim 2, wherein the third member is disposed on the second member so as to be able to slide between the first position and the second position.

4. The attaching mechanism according to claim 3, wherein a direction in which the third member slides is orthogonal to the predetermined direction.

5. The attaching mechanism according to claim 1, wherein the third member comprises a narrowing portion configured to narrow the insertion portion for disabling the fastening member from passing through the insertion portion when the third member is located at the second position.

6. The attaching mechanism according to claim 1, wherein the third member is disposed on the second member so as to cover part of the insertion portion when located at the second position as viewed in the predetermined direction.

7. The attaching mechanism according to claim 1, further comprising a positioning pin configured to position the second member with respect to the first member.

8. The attaching mechanism according to claim 7, wherein the positioning pin comprises a straight portion and a tapered portion joined with the straight portion.

9. The attaching mechanism according to claim 1, wherein the fastening member is able to be separated from the first member.

10. The attaching mechanism according to claim 1, further comprising a first electrical connection portion disposed in the first member, and a second electrical connection portion disposed in the second member and configured to be electrically connected to the first electrical connection portion,
wherein the insertion portion is formed around the second electrical connection portion.

11. The attaching mechanism according to claim 10, wherein the insertion portion is one of four insertion portions formed around the second electrical connection portion.

12. The attaching mechanism according to claim 1, wherein
the fastening member is a bolt, and
the fastened portion includes a screw hole.

13. A robot apparatus comprising:
a robot arm;
an end effector;
a fastening member;
a first member provided on the robot arm;
a fastened portion to which the fastening member is fastened, and which is provided on the first member;
a second member comprising an insertion portion through which the fastening member passes, and which is provided on the end effector; and
a third member configured to enable the fastening member to pass through the insertion portion when the third member is located at a first position, and engage with the fastening member and disable the fastening member from passing through the insertion portion when the third member is located at a second position,
wherein when the third member is located at the first position, the second member is contactable with the first member so that the fastening member passes through the insertion portion in a state where at least one portion of the fastening member has been fastened to the fastened portion, and
wherein when the third member is located at the second position, the fastening member is configured to be fastened to the fastened portion in a predetermined direction and the third member is pressed by the fastening member, whereby the second member is attached to the first member and the end effector is attached to the robot arm.

14. The robot apparatus according to claim 13, the attaching mechanism further comprising:
a first electrical connection portion disposed in the first member, and
a second electrical connection portion disposed in the second member and configured to be electrically connected to the first electrical connection portion,
wherein when the end effector is attached to the robot arm, the first electrical connection portion and the second electrical connection portion are electrically connected with each other.

15. A method for attaching an end effector to a robot arm via a fastening member,
the robot arm comprising a first member having a screw hole to which the fastening member is fastened,
the end effector comprising a second member and a third member, the second member comprising an insertion portion through which the fastening member passes, the third member being configured to enable the fastening member to pass through the insertion portion when the third member is located at a first position, and engage with the fastening member and disable the fastening member from passing through the insertion portion when the third member is located at a second position,
the method comprising:
moving the third member to the first position,
contacting the first member and the second member such that the fastening member passes through the insertion portion in a state where at least one portion of the fastening member has been fastened to the fastened portion,
moving the third member to the second position, and
fastening the fastening member to the fastened portion in a predetermined direction and pressing the third member by tightening the fastening member, thereby attaching the second member to the first member and attaching the end effector to the robot arm.

16. A method for attaching an end effector to a robot arm, comprising:
preparing an attaching mechanism, the attaching mechanism including
a fastening member,
a first member provided on the robot arm,
a fastened portion to which the fastening member is fastened, and
which is provided on the first member,
a second member comprising an insertion portion through which the fastening member passes, and which is provided on the end effector, and
a third member configured to enable the fastening member to pass through the insertion portion when the third member is located at a first position, and engage with the fastening member and disable the fastening member from passing through the insertion portion when the third member is located at a second position;
the method further comprising:
moving the third member to the first position;
contacting the first member and the second member such that the fastening member passes through the insertion portion in a state where at least one portion of the fastening member has been fastened to the fastened portion;
moving the third member to the second position; and
fastening the fastening member to the fastened portion in a predetermined direction and pressing the third member by tightening the fastening member, thereby attaching the second member to the first member and attaching the end effector to the robot arm.

17. A method for manufacturing a product by using the robot apparatus according to claim 13.

18. The attaching mechanism according to claim 1, wherein
the first member is integrated with the robot arm, and
the second member is integrated with the end effector.

19. The attaching mechanism according to claim 12, wherein the bolt is tightened by using an L-shaped screwdriver.

20. The attaching mechanism according to claim 10, wherein the second electrical connection portion is a spring contact.

21. The attaching mechanism according to claim 10, wherein
the first electrical connection portion is disposed in a hollow portion of the first member, and
the second electrical connection portion is disposed in a hollow portion of the second member.

22. The attaching mechanism according to claim 10, wherein
a line connected to the first electrical connection portion is disposed in a hollow portion of the first member, and
a line connected to the second electrical connection portion is disposed in a hollow portion of the second member.

* * * * *